US008559325B2

(12) United States Patent
Damnjanovic et al.

(10) Patent No.: US 8,559,325 B2
(45) Date of Patent: Oct. 15, 2013

(54) SYSTEMS AND METHODS FOR OVER THE AIR LOAD INDICATOR FOR WIRELESS SCHEDULING

(75) Inventors: Aleksandar Damnjanovic, Del Mar, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 12/881,990

(22) Filed: Sep. 14, 2010

(65) Prior Publication Data

US 2011/0222416 A1 Sep. 15, 2011

Related U.S. Application Data

(60) Provisional application No. 61/242,736, filed on Sep. 15, 2009.

(51) Int. Cl.
*H04L 12/26* (2006.01)

(52) U.S. Cl.
USPC .......................................... 370/252; 455/522

(58) Field of Classification Search
None
See application file for complete search history.

(56) References Cited

U.S. PATENT DOCUMENTS

| 6,101,179 | A * | 8/2000 | Soliman ........................ 370/342 |
| 6,574,461 | B1 | 6/2003 | Skoeld |
| 8,228,853 | B2 | 7/2012 | Ji et al. |
| 8,270,362 | B2 | 9/2012 | Uemura et al. |
| 2002/0114309 | A1 | 8/2002 | Chow et al. |
| 2004/0156328 | A1* | 8/2004 | Walton et al. ................. 370/313 |
| 2006/0203753 | A1* | 9/2006 | Toskala et al. ................ 370/278 |
| 2007/0064669 | A1 | 3/2007 | Classon et al. |
| 2007/0115878 | A1 | 5/2007 | Ashish et al. |
| 2008/0005219 | A1 | 1/2008 | Nabar et al. |
| 2008/0081564 | A1* | 4/2008 | Rao .............................. 455/63.1 |
| 2008/0081655 | A1* | 4/2008 | Shin et al. ..................... 455/522 |
| 2008/0220806 | A1* | 9/2008 | Shin et al. ..................... 455/522 |
| 2009/0075596 | A1 | 3/2009 | Gorokhov et al. |
| 2009/0197631 | A1 | 8/2009 | Palanki et al. |

(Continued)

FOREIGN PATENT DOCUMENTS

| KR | 20090083449 A | 8/2009 |
| WO | WO2008042187 A2 | 4/2008 |

(Continued)

OTHER PUBLICATIONS

3GPP TS 25.211 V6.10.0 (Sep. 2009) : 3rd Generation Partnership Project; Technical Specification Group Radio Access Network; Physical channels and mapping of transport channels onto physical channels (FDD) (Release 6), pp. 1-51.

(Continued)

*Primary Examiner* — Chi Pham
*Assistant Examiner* — Mohammad Adhami
(74) *Attorney, Agent, or Firm* — Nerrie M. Zohn

(57) ABSTRACT

Systems and methods for facilitating inter-cell interference coordination using load indication are described. A UE may receive load indicator signals from a plurality of base stations in adjacent cells and determine, based at least in part on the load indicator signals, a transmit power metric. The transmit power metric may be provided to a serving base station, which may allocate uplink resources based on the transmit power metric. Additional information related to receiver sensitivity and/or path loss may be used to determine the transmit power metric.

16 Claims, 18 Drawing Sheets

(56) References Cited

U.S. PATENT DOCUMENTS

| | | | |
|---|---|---|---|
| 2010/0220808 | A1* | 9/2010 | Kishigami et al. ............ 375/295 |
| 2010/0273502 | A1 | 10/2010 | Uemura et al. |
| 2011/0003598 | A1 | 1/2011 | Ma et al. |
| 2011/0038271 | A1* | 2/2011 | Shin et al. .................... 370/252 |
| 2011/0171955 | A1 | 7/2011 | Acharya |
| 2011/0194483 | A1 | 8/2011 | Ji et al. |
| 2011/0223929 | A1 | 9/2011 | Boudreau et al. |
| 2012/0021753 | A1 | 1/2012 | Damnjanovic et al. |
| 2012/0082120 | A1 | 4/2012 | Chun et al. |
| 2013/0077586 | A1 | 3/2013 | Damnjanovic et al. |

FOREIGN PATENT DOCUMENTS

| | | | |
|---|---|---|---|
| WO | WO2008055132 | * | 5/2008 |
| WO | WO2008055132 | A2 | 5/2008 |
| WO | WO2008058143 | * | 5/2008 |
| WO | WO2008069105 | * | 6/2008 |
| WO | WO2008109162 | A2 | 9/2008 |
| WO | 2009022473 | A1 | 2/2009 |

OTHER PUBLICATIONS

3GPP TS 25.212 V6.10.0 (Dec. 2006) : 3rd Generation Partnership Project; Technical Specification Group Radio Access Network; Multiplexing and channel coding (FDD) (Release 6), pp. 1-84.

3GPP TS 25.213 V6.5.0 (Mar. 2006) : 3rd Generation Partnership Project; Technical Specification Group Radio Access Network; Spreading and modulation (FDD) (Release 6), pp. 1-32.

International Search Report and Written Opinion—PCT/US2010/048982, International Search Authority—European Patent Office—Dec. 1, 2010.

TIA/EIA Interim Standard: CDMA2000 High Rate Packet Data Air Interface Specification, TIA/EIA/IS-856, Nov. 2000, pp. 1-450.

3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V9.1.0, Jan. 7, 2010, pp. 1-221, XP050401822, [retrieved on Jan. 7, 2010].

3rd Generation Partnership Project; Technical Specification Group Radio Access Network; Evolved Universal Terrestrial Radio Access Network (E-UTRAN); X2 application protocol (X2AP) (Release 9), 3GPP Standard; 3GPP TS 36.423, 3rd Generation Partnership Project (3GPP), Mobile Competence Center; 650, Route Des Lucioles; F-06921 Sophia-Antipolis Cedex; France, No. V9.1.0,18 Dec. 18, 2009, pp. 1-114, XP050401360, [retrived on Dec. 18, 2009].

CMCC: "Summary of HeNB interference management methods based on different interference scenarios", 3GPP Draft; R4-093611, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050393223, [retrieved on Oct. 6, 2009].

Lucent Technologies: "Uplink Scheduling With Inter-cell Interference Control", 3GPP Draft; R2-062814, 3rd Generation Partnership Project (3GPP), Mobile Competence Centre ; 650, Route Des Lucioles ; F-06921 Sophia-Antipolis Cedex ; France, vol. RAN WG2, No. Seoul, Korea; Oct. 5, 2006, XP050132339.

Nokia Siemens Networks et al: "Way Forward on Relative Narrowband TX Power Indicator for DL ICIC", 3GPP Draft; R1-082179, 3rd Generation Partnership Project (3GPP), Mobile Competence Centre ; 650, Route Des Lucioles ; F-06921 Sophia-Antipolis Cedex ; France, vol. RAN WG3, No. Jeju Island; Aug. 1, 2008, XP050164782, [retrieved on Aug. 1, 2001].

Nokia Siemens Networks: "Uplink and Downlink ICIC Indication", 3GPP Draft; R3-080398, 3rd Generation Partnership Project (3GPP), Mobile Competence Centre ; 650, Route Des Lucioles ; F-06921 Sophia-Antipolis Cedex ; France, vol. RAN WG3, No. Sorrento, Italy; Feb. 6, 2008, XP050163602, [retrieved on Feb. 6, 2008].

Qualcomm Europe, "UL Interference Control in the Absence of X2 for Rel 9", 3GPP Draft, R1-091442 ICIC With No. X2, 3rd Generation Partnership Project (3GPP), Mobile Competence Centre, 650, Route Des Lucioles, F-06921 Sophia-Antipolis Cedex, France, No. Seoul, Korea, Mar. 18, 2009, XP050339016.

Samsung, "Multi-user MIMO enhancement in LTE-A", 3GPP Draft, RI-092680 MU-MIMO, 3rd Generation Partnership Project (3GPP), Mobile Competence Centre , 650, Route Des Lucioles , F-06921 Sophia-Antipolis Cedex , France, No. Los Angeles, USA, Jun. 24, 2009, XP050351160.

Taiwan Search Report—TW099131273—TIPO—May 2, 2013.

* cited by examiner

SYSTEMS AND METHODS FOR OVER THE AIR LOAD INDICATOR FOR WIRELESS SCHEDULING

CROSS-REFERENCE TO RELATED APPLICATIONS

This application claims priority under 35 U.S.C. §119(e) to U.S. Provisional Patent Application Ser. No. 61/242,736 entitled OVER THE AIR LOAD INDICATOR FOR WIRELESS SCHEDULING, filed on Sep. 15, 2009, the content of which is hereby incorporated by reference herein in its entirety for all purposes.

FIELD

This application is directed generally to wireless communications systems. More particularly, but not exclusively, the application relates to methods and apparatus for providing over the air (OTA) load indication signaling to facilitate inter-cell interference coordination (ICIC) and associated scheduling in wireless communication systems.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs). Each terminal communicates with one or more base stations (also know as access points (APs), EnodeBs or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via a single-in-single-out, single-in-multiple out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into NS independent channels, which are also referred to as spatial channels. Generally, each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Base station nodes sometimes referred to as eNBs have different capabilities for deployment in a network. This includes transmission power classes, access restriction, and so forth. In one aspect, heterogeneous network characteristics create wireless coverage dead spots (e.g., Donut coverage hole). This may cause severe inter-cell interference requiring undesirable user equipment cell association. In general, heterogeneous network characteristics require deep penetration of physical channels, which may cause unwanted interference between nodes and equipment on the respective network.

As the number of mobile stations deployed increases, the need for proper bandwidth utilization becomes more important. Moreover, with the introduction of semiautonomous base stations for managing small cells, such as femtocells, in systems such as LTE, interference with existing base stations may become an increasing problem.

SUMMARY

This disclosure is directed generally to inter-cell interference coordination (ICI) in a wireless communication system. By example, one function performed by access terminals (ATs) or user equipments (UEs) in wireless communication systems, such as LTE systems, relates to interference and path loss determinations for surrounding transmitters that may be in adjacent or neighboring cells. These determinations may be employed in identifying network base stations, performing handoff determinations, managing interference between network cells, or other inter-network or ICIC functions. Depending on various conditions (e.g., current network load, prevailing wireless conditions, channel quality, path loss on one or more wireless links, etc.), it may be desirable to schedule UE transmissions on particular resources and/or at particular transmit powers in a manner that mitigates interference to neighboring cells and associated base stations.

Accordingly, by example, the disclosure may relate to a method for providing inter-cell interference coordination (ICIC). The method may include, for example, receiving one or more load indicator (LI) signals from a corresponding one or more network nodes and determining a transmit power metric based at least in part on the one or more load indicator signals. The method may further include sending the transmit power metric to a serving network node.

The network node may operate in, for example, an adjacent cell. The one or more load indicator signals may be provided from one or more corresponding network nodes; the corresponding network nodes may be configured to operate in corresponding adjacent cells. The step of determining a transmit power metric may include, for example, generating a maximum power per resource block metric. The maximum power per resource block metric may be based, for example, on a subband metric generated for each of one or more configured subbands.

The method may further include, for example, receiving receiver sensitivity data, and the transmit power metric may be further based in part on the receiver sensitivity data. The transmit power metric may be further based, for example, in part on a path loss value associated with one or more of the corresponding network nodes. The step of sending may include, for example, sending the transmit power metric in a protocol data unit (PDU) format corresponding to a configured number of subbands. The step of determining a transmit power metric may include, for example, determining ones of a plurality of maximum power metrics for each of the plurality of load indicator signals. The transmit power metric may be based, for example, on one or more of the maximum power metrics for each of the plurality of load indicator signals.

The step of determining a transmit power metric may include, for example, determining ones of a plurality of maximum power metrics for each of the plurality of load indicator signals, and the transmit power metric may be based on a minimum of the plurality of maximum power metrics. The serving network node may be, for example, an eNB and the plurality of network nodes may be, for example, eNBs. The step of determining may be performed, for example, during a single subframe. The step of sending may be performed, for example, once per subframe or once per an integer multiple of subframes. The method may further include receiving a specific uplink channel assignment, and the transmit power metric may be sent on the received uplink channel assignment.

In another aspect, the disclosure relates to a computer program product. The computer program product may include, for example, a computer-readable medium containing codes for causing a computer to receive one or more load indicator signals from one or more network nodes and determine a transmit power metric based at least on part on the one or more load indicator signals. The codes may further include, for example, codes for causing the computer to send the transmit power metric to a serving network node.

In another aspect, the disclosure relates to a communications device. The communication device may include, for example, a receiver module configured to receive one or more load indicator signals from one or more network nodes, a processor module configured to determine a transmit power metric based at least in part on the one or more load indicator signals, and a transmitted module configured to send the power metric to a serving network node.

In another aspect, the disclosure relates to a communications device. The communication device may include, for example, means for receiving one or more load indicator signals from one or more network nodes, means for determining a transmit power metric based at least on part on the one or more load indicator signals, and means for sending the transmit power metric to a serving network node.

In another aspect, the disclosure relates to a method for providing inter-cell interference coordination (ICIC). The method may include, for example, determining ones of a plurality of maximum power metrics for each of a plurality of load indicator signals provided from a corresponding plurality of adjacent network nodes. The method may further include, for example, generating a transmit power metric based on the plurality of maximum power metrics. The transmit power metric may be stored in a memory.

The transmit power metric may be based, for example, on a minimum of the ones of a plurality of maximum power metrics. The transmit power metric may include, for example, a plurality of the maximum power metrics. The transmit power metric may be based, for example, in part on a receiver sensitivity metric corresponding to the adjacent node. The receiver sensitivity metric may include, for example, a nominal receiver sensitivity metric and/or a UE-based offset metric. Alternately or in addition, the transmit power metric may be based, for example, in part on an estimated path loss metric towards the adjacent network node. The maximum power metric may be based, for example, in part on an accumulated over the air (OTA) interference correction value. The transmit power metric may be generated, for example, once per subframe. The method may further include, for example, sending the transmit power metric to a serving network base station.

In another aspect, the disclosure relates to a computer program product. The computer program product may include, for example, a computer-readable medium containing codes for causing a computer to determine ones of a plurality of maximum power metrics for each of a plurality of load indicator signals provided from a corresponding plurality of adjacent network nodes and generate a transmit power metric based on the plurality of maximum power metrics. The codes may further include codes for storing the transmit power metric in a memory.

In another aspect, the disclosure relates to a communications device. The communications device may include, for example, a receiver module configured to determining ones of a plurality of maximum power metrics for each of a plurality of load indicator signals provided from a corresponding plurality of adjacent network nodes, a processor module configured to generate a transmit power metric based on the plurality of maximum power metrics, and a memory configured to store the transmit power metric.

In another aspect, the disclosure relates to a communications device. The communication device may include, for example, means for determining ones of a plurality of maximum power metrics for each of a plurality of load indicator signals provided from a corresponding plurality of adjacent network nodes, means for generating a transmit power metric based on the plurality of maximum power metrics, and means for storing the transmit power metric.

In another aspect, the disclosure relates to a method for providing load indication. The method may include, for example, receiving a transmit power metric from a served UE and generating, based at least in part on the transmit power metric, an uplink scheduling assignment for the served UE.

The transmit power metric may include, for example, a maximum power per resource block metric. The transmit power metric may be received once per subframe or once per an integer multiple of subframes.

The method may further include, for example, providing an uplink allocation for sending the transmit power metric, and receiving the transmit power metric consistent with the allocation. The method may further include sending the uplink scheduling assignment to the served UE.

In another aspect, the disclosure relates to a computer program product. The computer program product may include, for example, a computer-readable medium containing codes for causing a computer to receive a transmit power metric from a served UE and generate, based at least in part on the transmit power metric, an uplink scheduling assignment for the served UE.

In another aspect, the disclosure relates to a communications device. The communications device may include, for example, a receiver module configured to receive a transmit power metric from a served UE. The communications device may further include, for example, a processor module configured to generate, based at least in part on the transmit power metric, an uplink scheduling assignment for the served UE.

In another aspect, the disclosure relates to a communications device. The communication device may include, for example, means for receiving a transmit power metric from a served UE. The communications device may further include, for example, means for generating, based at least in part on the transmit power metric, an uplink scheduling assignment for the served UE.

In another aspect, the disclosure relates to a method for providing an over the air load indicator signal (OTA LI). The method may include, for example, generating a load indicator signal and sending the load indicator signal to one or more wireless network nodes associated with one or more adjacent wireless network cells.

The method one or more wireless network nodes may be user equipments (UEs). The OTA LI may be based, for example, on a measured filtered interference over thermal noise (IoT). The method may further include, for example, sending receiver sensitivity information to one or more base stations in adjacent or neighboring cells.

In another aspect, the disclosure relates to a computer program product. The computer program product may include, for example, a computer-readable medium containing codes for causing a computer to generate a load indicator signal and send the load indicator signal to one or more wireless network nodes associated with one or more adjacent wireless network cells.

In another aspect, the disclosure relates to a communications device. The communications device may include, for example, a processor module configured to generate a load indicator signal. The communications device may further include, for example, and a transmitter module configured to send the load indicator signal to one or more wireless network nodes associated with one or more adjacent wireless network cells.

In another aspect, the disclosure relates to a communications device. The communications device may include, for example, means for generating a load indicator signal. The communications device may further include, for example, means for sending the load indicator signal to one or more wireless network nodes associated with one or more adjacent wireless network cells.

Additional aspects are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
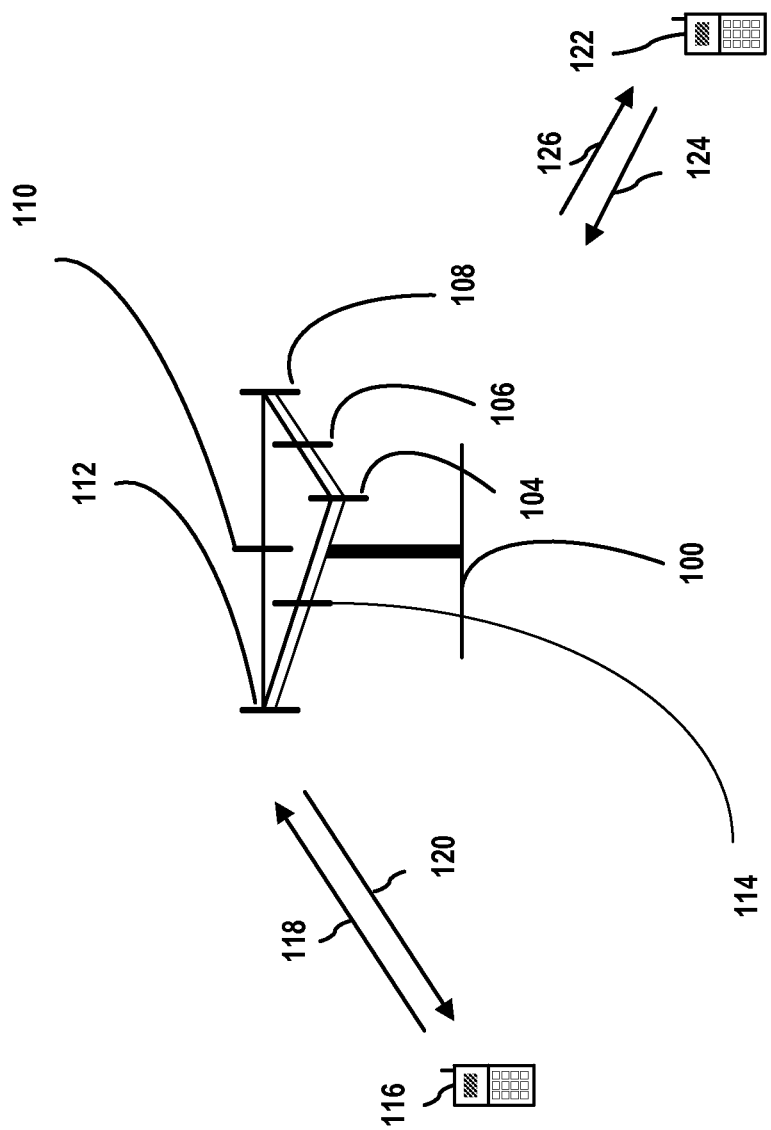
FIG. 1 illustrates details of a wireless communications system.

This disclosure is directed generally to wireless communications systems. More particularly, but not exclusively, the application relates to methods and apparatus for providing over the air (OTA) load indication signaling to facilitate inter-cell interference coordination (ICIC) and associated processing and scheduling in wireless communications systems. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

Before describing aspects, details and terminology associated with various communication systems on which embodiments may be implemented are further described below.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Single carrier frequency division multiple access (SC-FDMA), which utilizes single carrier modulation and frequency domain equalization, is a technique that may be used in 3GTPP Long Term Evolution (LTE) or other communication systems. SC-FDMA has similar performance and essentially the same overall complexity as OFDMA implementations. However, SC-FDMA signal has lower peak-to-average power ratio (PAPR) because of its inherent single carrier structure. Consequently, SC-FDMA has drawn a great deal of attention, especially in the uplink communications where lower PAPR greatly benefits the mobile terminal in terms of transmit power efficiency. It is currently a working assumption for uplink multiple access scheme in LTE.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

In addition, the DL PHY channels may include the following: P Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator Channel (LICH)

The UL PHY Channels may include the following:
  Physical Random Access Channel (PRACH)
  Channel Quality Indicator Channel (CQICH)
  Acknowledgement Channel (ACKCH)
  Antenna Subset Indicator Channel (ASICH)
  Shared Request Channel (SREQCH)
  UL Physical Shared Data Channel (UL-PSDCH)
  Broadband Pilot Channel (BPICH)

The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:

| | |
|---|---|
| AM | Acknowledged Mode |
| AMD | Acknowledged Mode Data |
| ARQ | Automatic Repeat Request |
| BCCH | Broadcast Control CHannel |
| BCH | Broadcast CHannel |
| C- | Control- |
| CCCH | Common Control CHannel |
| CCH | Control CHannel |
| CCTrCH | Coded Composite Transport Channel |
| CP | Cyclic Prefix |
| CRC | Cyclic Redundancy Check |
| CTCH | Common Traffic CHannel |
| DCCH | Dedicated Control CHannel |
| DCH | Dedicated CHannel |
| DL | DownLink |
| DSCH | Downlink Shared CHannel |
| DTCH | Dedicated Traffic CHannel |
| FACH | Forward link Access CHannel |
| FDD | Frequency Division Duplex |
| L1 | Layer 1 (physical layer) |
| L2 | Layer 2 (data link layer) |
| L3 | Layer 3 (network layer) |
| LI | Length Indicator |
| LSB | Least Significant Bit |
| MAC | Medium Access Control |
| MBMS | Multmedia Broadcast Multicast Service |
| MCCH | MBMS point-to-multipoint Control CHannel |
| MRW | Move Receiving Window |
| MSB | Most Significant Bit |
| MSCH | MBMS point-to-multipoint Scheduling CHannel |
| MTCH | MBMS point-to-multipoint Traffic CHannel |
| PCCH | Paging Control CHannel |
| PCH | Paging CHannel |
| PDU | Protocol Data Unit |
| PHY | PHYsical layer |
| PhyCH | Physical CHannels |
| RACH | Random Access CHannel |
| RLC | Radio Link Control |
| RRC | Radio Resource Control |
| SAP | Service Access Point |
| SDU | Service Data Unit |
| SHCCH | SHared channel Control CHannel |
| SN | Sequence Number |
| SUFI | SUper FIeld |
| TCH | Traffic CHannel |
| TDD | Time Division Duplex |
| TFI | Transport Format Indicator |
| TM | Transparent Mode |
| TMD | Transparent Mode Data |
| TTI | Transmission Time Interval |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |
| MBSFN | Multicast broadcast single frequency network |
| MCE | MBMS coordinating entity |
| MCH | Multicast channel |
| DL-SCH | Downlink shared channel |

-continued

| | |
|---|---|
| MSCH | MBMS control channel |
| PDCCH | Physical downlink control channel |
| PDSCH | Physical downlink shared channel |

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement and the like. MIMO systems using multiple antennas generally provide for coordination of sending of reference signals between antennas, however, LTE systems do not in general provide for coordination of sending of reference signals from multiple base stations or eNBs.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
|---|---|---|
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |

TABLE 1-continued

| Link | Reference Signal | Description |
|---|---|---|
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from the base station, access point or eNodeB to the terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 sub frames of 1 ms each. Every sub frame consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the PDCCH is used for sending control, the PHICH for sending ACK/NACK, the PCFICH for specifying the number of control symbols, the Physical Downlink Shared Channel (PDSCH) for data transmission, the Physical Multicast Channel (PMCH) for broadcast transmission using a Single Frequency Network, and the Physical Broadcast Channel (PBCH) for sending important system information within a cell. Supported modulation formats on the PDSCH in LTE are QPSK, 16QAM and 64QAM.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16QAM and 64QAM.

If virtual MIMO/spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "user device" or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

One function performed by access terminals (ATs) or user equipments (UEs) in wireless communication systems, such as LTE systems, relates to interference and path loss determinations for surrounding transmitters that may be in adjacent or neighboring cells. These determinations may be employed in identifying network base stations, performing handoff determinations, managing interference between network cells, or other inter-network or ICIC functions. Depending on various conditions (e.g., current network load, prevailing wireless conditions, channel quality, path loss on one or more wireless links, etc.), it may be desirable to schedule UE transmissions on particular resources and/or at particular transmit powers in a manner that mitigates interference to neighboring cells and associated base stations. In order to control scheduling, it may be desirable to provide over the air (OTA) load indication signaling to UEs or other wireless nodes in adjacent or neighboring cells. The UEs may use this information, and/or additional information, to determine a transmit power metric, which may be reported to a serving base station, such as an eNB. In addition, it may be desirable to minimize interference over thermal noise (IoT), and maximize data throughput for wireless communications in various aspects.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents. Accordingly, it should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates details aspects of an example multiple access wireless communication system, such as an LTE system. An evolved Node B (eNB) 100 (which may also be denoted as an access point or AP) includes multiple antenna groups, one including 104 and 106, another including 108 and 110, and an additional including 112 and 114. In FIG. 1, only two antennas are shown for each antenna group, however, more or fewer antennas may be utilized for each antenna group. A user equipment (UE) 116 (also known as an access terminal or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 is in communication with antennas 106 and 108, where antennas 106 and 108 transmit information to UE 122 over forward link 126 and receive information from access terminal 122 over reverse link 124. In a frequency division duplex (FDD) system, communication links 118, 120, 124 and 126 may use different frequency for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 100 may utilize beam-forming in order to improve the signal-to-noise ratio of forward links for the different UEs 116 and 124. Also, an eNB using beam-forming to transmit to UEs scattered randomly through its coverage generally causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology.

Figure 2:
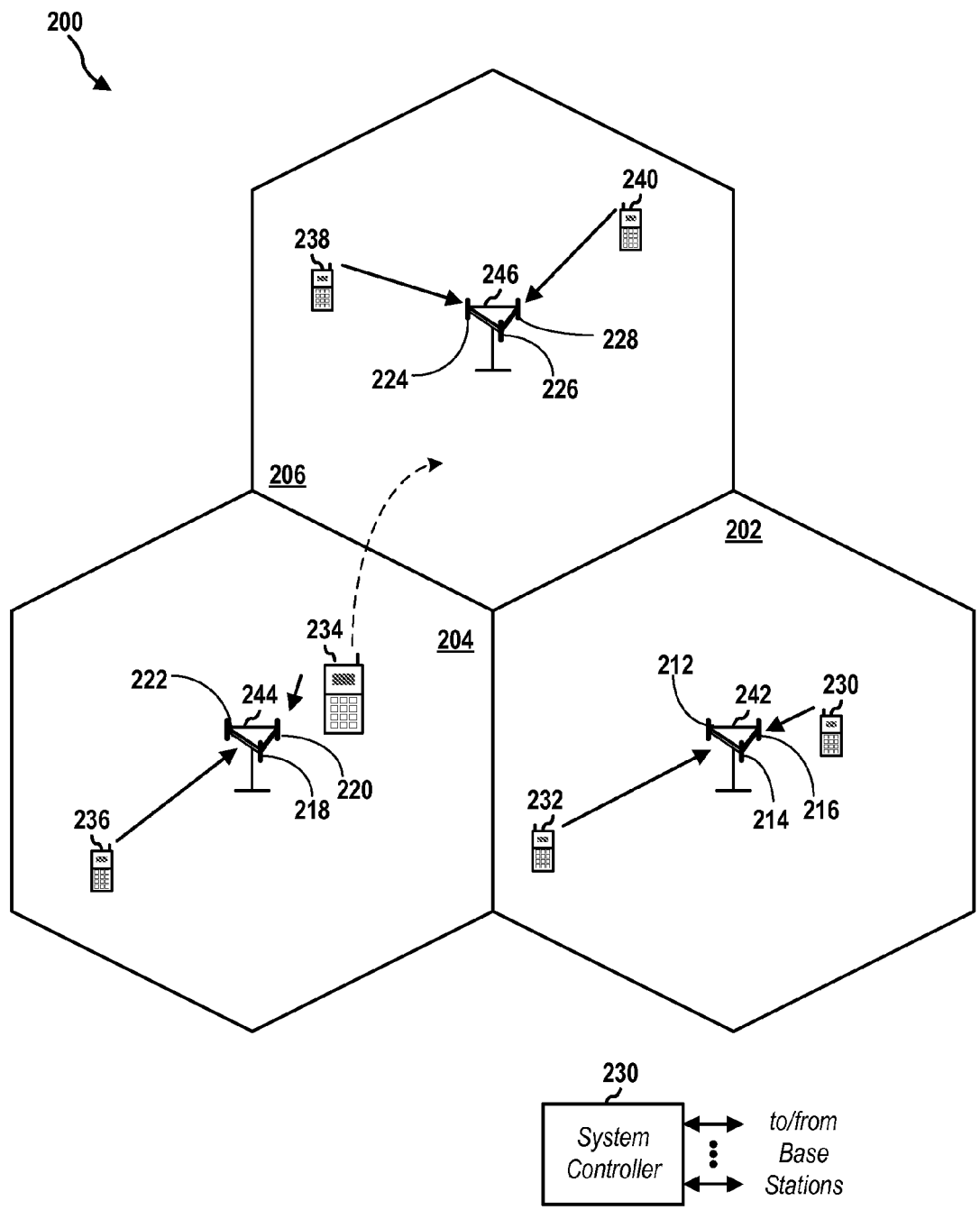
FIG. 2 illustrates details of a wireless communications system having multiple cells and associated wireless network nodes.

FIG. 2 illustrates details aspects of an example multiple access wireless communication system 200, such as an LTE system. The multiple access wireless communication system 200 includes multiple cells, including cells 202, 204, and 206 that may be neighboring or adjacent. In one aspect, one or more of the cells 202, 204, and 206 may include an eNB that includes multiple sectors. The multiple sectors can be formed by groups of antennas with each antenna responsible for communication with UEs in a portion of the cell, such as described previously with respect to FIG. 1. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 can include several wireless communication devices, e.g., user equipment (UEs), which communicate with one or more sectors of each cell 202, 204 or 206. For example, UEs 230 and 232 can be in communication with eNB 242, UEs 234 and 236 can be in communication with eNB 244, and UEs 238 and 240 can be in communication with eNB 246. UEs may be able to receive signals from adjacent cells and associated eNBs. For example, UE 234 may be associated with serving node eNB 244, however, UE 234 may also be able to receive signals from adjacent cells 202 and 206 from corresponding eNBs 242 and 246. These signals may include loading indication signaling as further described below.

Figure 3:
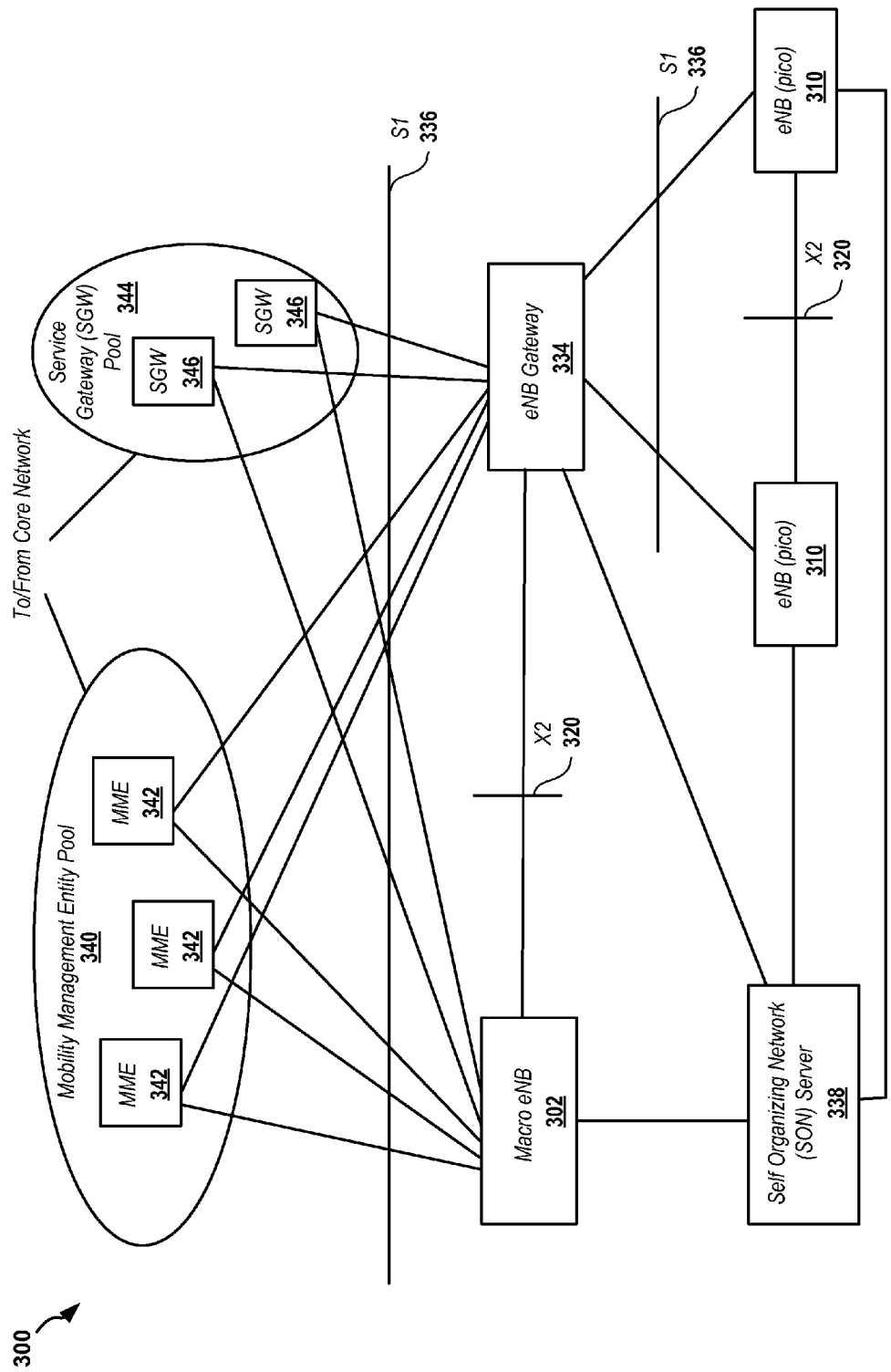
FIG. 3 illustrates details of an embodiment of inter-cell coordination between wireless network nodes.

Certain distributed functions and processing may be done in some implementations by direct communications or negotiations between eNBs such as those shown in FIG. 2. FIG. 3 illustrates details of an embodiment of a network 300 illustrating details of example eNB interconnection with other eNBs. Network 300 includes a macro-eNB 302 and multiple additional eNBs, which may be picocell or femtocell eNBs 310. Network 300 may include an HeNB gateway 334 for scalability reasons. The macro-eNB 302 and the gateway 334 may each communicate with a pool 340 of mobility management entities (MME) 342 and/or a pool 344 of serving gateways (SGW) 346. The eNB gateway 334 may appear as a C-plane and a U-plane relay for dedicated S1 connections 336. An S1 connection 336 may be a logical interface specified as the boundary between an evolved packet core (EPC) and an Evolved Universal Terrestrial Access Network (EU-TRAN). As such, it provides an interface to a core network (not shown) which may be further coupled to other networks. The eNB gateway 334 may act as a macro-eNB 302 from an EPC point of view. The C-plane interface may be S1-MME and the U-plane interface may be S1-U.

The eNB gateway 334 may act towards an eNB 310 as a single EPC node. The eNB gateway 334 may ensure S1-flex connectivity for an eNB 310. The eNB gateway 334 may provide a 1:n relay functionality such that a single eNB 310 may communicate with n MMEs 342. The eNB gateway 334 registers towards the pool 340 of MMEs 342 when put into operation via the S1 setup procedure. The eNB gateway 334 may support setup of S1 interfaces 336 with the eNBs 310.

Network 300 may also include a self-organizing network (SON) server 338. The SON server 338 may provide automated optimization of a 3GPP LTE network. The SON server 338 may be a key driver for improving operation and maintenance (O&M) to the wireless communication system 300. An X2 link 320 may exist between the macro-eNB 302 and the eNB gateway 334. X2 links 320 may also exist between each of the eNBs 310 connected to a common eNB gateway 334. The X2 links 320 may be set up based on input from the SON server 338. An X2 link 320 may convey ICIC information. If an X2 link 320 cannot be established, the S1 link 336 may be used to convey ICIC information. Backhaul signaling may be used in communication system 300 to manage various functionality as described further herein between macro-eNB 302 and eNBs 310. For example, these connections may be used as further described successively herein to facilitate subframe allocation coordination and scheduling.

Figure 4:
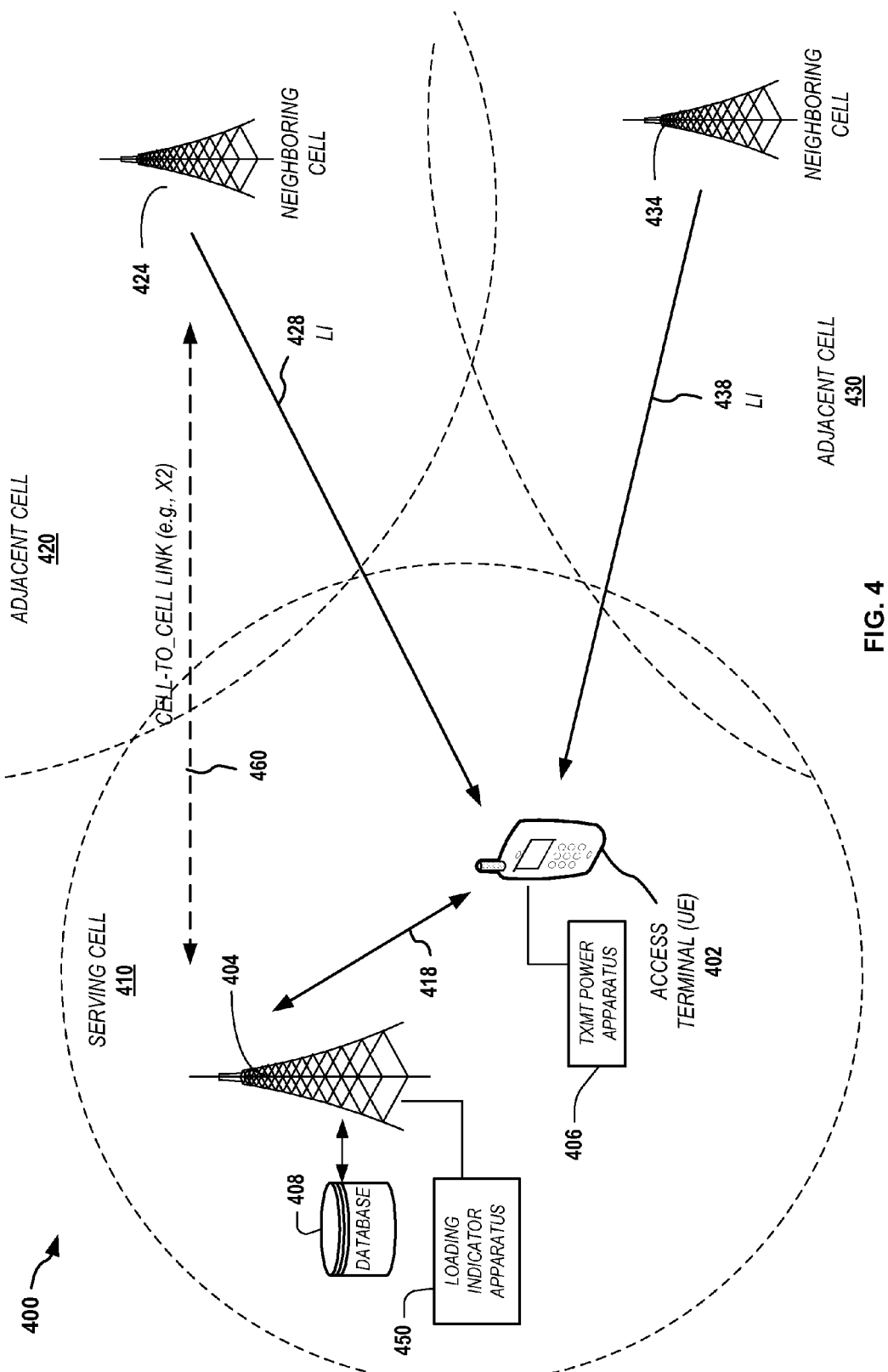
FIG. 4 illustrates details of an embodiment of a wireless communication system on which inter-cell interference coordination may be implemented.

FIG. 4 illustrates details an example embodiment of a wireless communication system 400 configured to provide inter-cell interference coordination in accordance with aspects of the disclosure. System 400 includes a UE (or access terminal) 402 in communication with a serving eNB (or base station or equivalent wireless network node) 404 via wireless link 418, which may include an uplink and a downlink connection. eNB 404 may be associated with a serving cell 410. In addition, UE 402 may be in wireless range of two (or more) adjacent or neighboring cells 420 and 430, which may be served by eNBs 424 and 434 respectively. Cell to cell communication may be done via an inter-cell link, such as an X2 connection 460 as shown between cells 410 and 420 and associated eNBs 404 and 424. Other X2 connections between cells (not shown) may also be configured.

UE 402 may receive system data from serving cell node 404 in furtherance of the inter-cell interference coordination via a downlink component of connection 418, and may also receive other data or information depending on the connection mode. UE 402 may also send data to node 404 via an uplink component connection 418 in further of inter-cell interference coordination as further described below. The system data may include receiver sensitivity information for one or more of the neighboring cells 420, 430, aggregated receiver sensitivity data (e.g., average receiver sensitivity), and/or nominal sensitivity data where specific data is not available. Additionally, the system data may include transmit power of nodes of the respective neighboring cells 420 and 430 (e.g., nodes 424 and 434), and/or other cells and associated nodes not shown.

The system data may be employed by a transmit power apparatus 406 which may be incorporated as a module in UE 402 for determining a suitable transmit power metric to be used to facilitate interference mitigation with neighboring cells 420, 430 (or other cells not shown). The transmit power metric may be based at least in part on receiver sensitivity data and/or other data as described further herein. In addition, the transmit power metric may be based at least in part on a measure of network interference observed by the respective neighboring cells 420, 430 (and/or other cells not shown). For example, a downlink signal may be received at UE 402 from signal path 428, which may then be used to generate transmit power metric data based on the signal. Likewise, a downlink signal 438 may be received from eNB 434 of cell 430 and similarly used either alone or in conjunction with the signal from eNB 424 to generate transmit metric data.

In addition, the transmit power metric may be based on wireless conditions, such as path loss or other information as further described herein.

Figure 5:
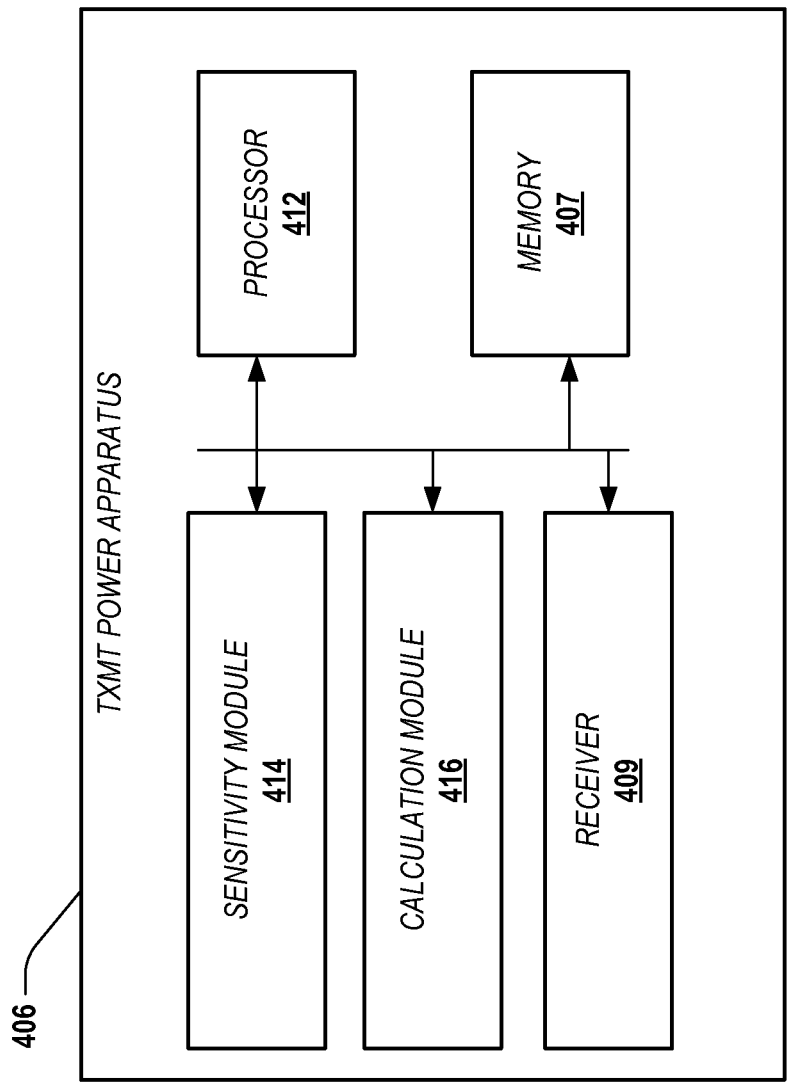
FIG. 5 illustrates details of an embodiment of a transmit power apparatus.

FIG. 5 illustrates details of an example embodiment of a transmit power apparatus 406. Power apparatus 406 may include a data processor element 412, which may be a standalone processor and/or a processing element of UE 402. Apparatus 406 may further include a receiver module 409 configured to receive signals from serving base stations, such as eNB 404, as well as other base stations, such as adjacent base stations 424 and 434. Processor 412 may be configured to activate transmit power apparatus 406 when UE 402 wakes up, such as from an inactive state. In this case, transmit power apparatus 406 may analyze loading indicator information and/or system data or information upon activating or transitioning to a new cell.

In another aspect, a discontinuous receive (DRX) procedure may be modified such that the data processor activates transmit power apparatus 406 in between active receive states. Alternately, variations of the foregoing aspects may be used, as well as other activation procedures based on appropriate operational events or conditions.

System data may be parsed by processor 412, and parsed data may be stored in memory 407. A receiver sensitivity module 414 may be included to identify receiver sensitivity data for respective neighboring cells 404A, 404B, and/or aggregated/nominal data. The sensitivity data may be forwarded to a calculation module 416, which may employ the sensitivity data in determining a transmit power metric for the UE 402. Additionally, calculation module 416 may employ a loading indicator (LI) signal and/or associated data provided by the respective neighboring cells 404A, 404B for the transmit power metric determination, as well as path loss data for the transmit power metric determination.

As one particular example, calculation module 416 may employ a processing method of the following form for generating a transmit power metric.

Assuming, for example, that there are k neighboring cells, for each neighboring cell, a computation of a maximum power per resource block ($P_{RBmax}$) each subframe, i (for each reporting subband) may be done. For example, the $P_{RBmax}$ for each adjacent cell may be computed in accordance with the following:

$$P_{RBmax}(i,k) = Po_{PUSCH}int(k) + PL(i,k) + f(i,k);$$

where $Po_{PUSCH}int(k)$ is a receiver sensitivity value at the corresponding neighboring base station (eNB), k is the neighboring cell, i is the subframe index, PL(i, k) is a path loss metric that represents an estimated path loss towards the neighboring eNB, k, and $f(i,k)$ is an accumulated over the air (OTA) interference correction, which may be determined as further described below.

In one implementation, the receiver sensitivity $Po_{puscH}int(k)$ value may be determined as follows:

$$Po_{PUSCH}int(k) = Po_{PUSCH_{nom}}int(k) + Po_{PUSCHUE}int;$$

Where $Po_{PUSCH_{nom}}int(K)$ is a nominal receiver sensitivity associated with cell k, and $Po_{PUSCHUE}int$ is a UE specific offset value.

In some implementations, PL(i,k) and/or $f(i,k)$ may be omitted or replaced with other similar, equivalent or additional parameters.

Subsequent to determining $P_{RBmax}(i,k)$ for each neighboring cell, a $P_{RBmax}$ per subframe value ($P_{RBmax}(i)$) may be generated at the UE. This metric may be based on a minimum $P_{RBmax}$ value among all neighboring or adjacent eNBs, for example;

$$P_{RBmax}(i) = \min_k(P_{RBmax}(i,k)).$$

The UE (e.g., UE 402) may then send the $P_{RBmax}(i)$ value as the transmit power metric.

In some implementations, PL(i,k) and/or $f(i,k)$ may be omitted or replaced with other similar, equivalent or additional parameters. For example, in some embodiments, the nominal receiver sensitivity parameter PL(i, k) may also be a function of path loss difference, or may be a path loss value alone.

Figure 7:
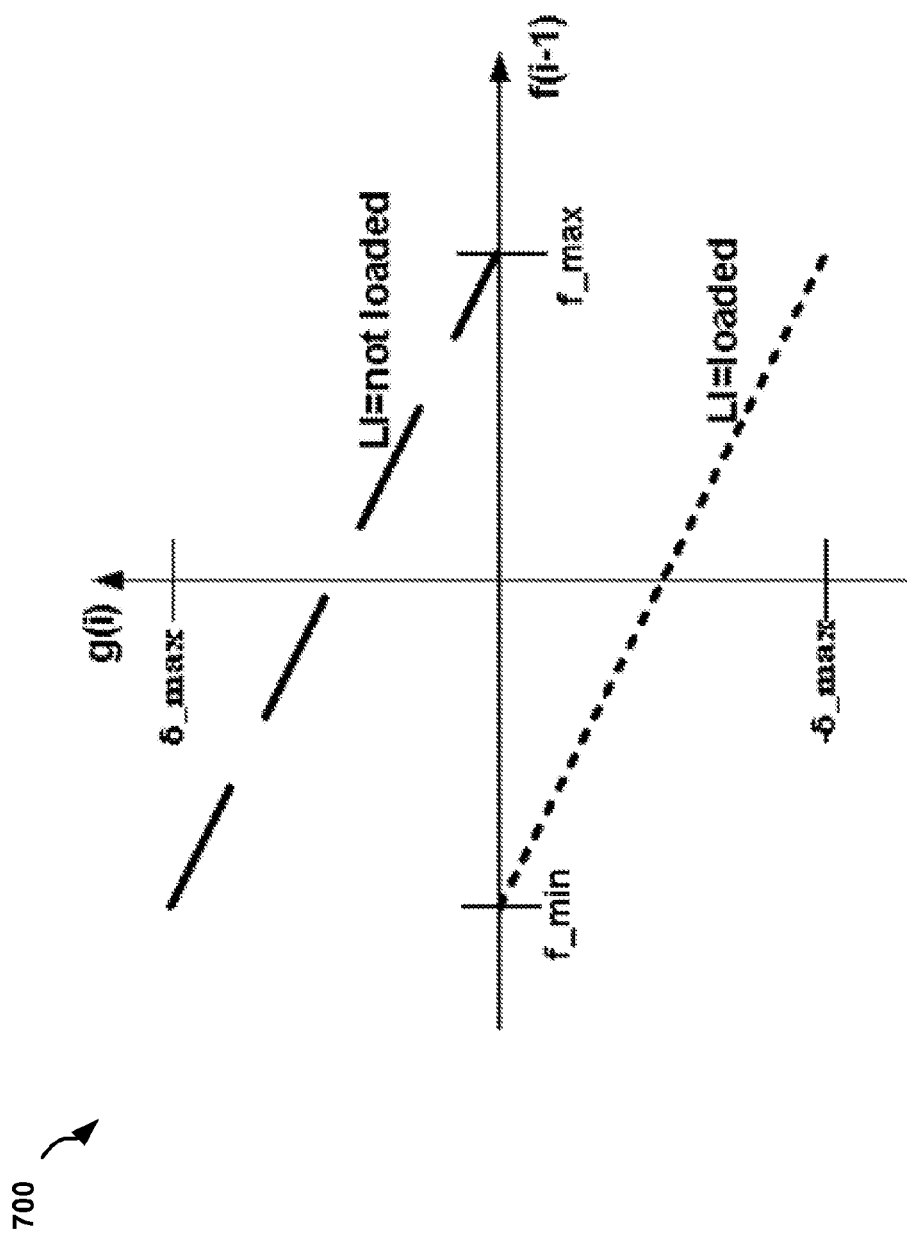
FIG. 7 illustrates details of an embodiment of a functional mapping of load indicator values for loaded and not-loaded states.

The accumulated OTA interference correction, $f(i,k)$, represents accumulated correction. In one embodiment, it may be generated based on processing a one bit value as shown in FIG. 7. For an OTA Load Indicator above a threshold target:

at $f(i-1) = f_{min}$: $g(i) = 0$; and at $f(i-1) = f_{max}$: $g(i) = -\delta_{max}$ For an OTA Load Indicator below the threshold target:

at $f(i-1) = f_{min}$: $g(i) = \delta_{max}$ and at $f(i-1) = ff_{max}$: $g(i) = 0$ where g(i) is a function ($f(i-1)$) and $f(i)$=sum(from j=0,i) of g(j).

For the above processing, an interference correction $f(i)$ for a given resource block may be based on current wireless conditions, and/or on the previous subframe and/or a combination of prior subframes. Additionally, if the OTA loading indicator (physical broadcast channel—PBCH) is erased, the processing can assume the loading indicator is above the threshold target if, at $f(i-1)$, g(i)>0, assume the loading indicator is below the threshold target if, at $f(i-1)$, g(i)<0, and set g(i)=0 if $f(i-1)$=0. An example mapping between $f(i-1)$ and g(i) is illustrated in FIG. 7, where the mapping is linear. However, other functional relationships, such as exponential, square law or other power law, and/or other relationships may be used in various embodiments.

In addition, although the above example described processing based on a one-bit algorithm, two-bit or larger bit size processing logic may be used in some implementations. For example, a two-bit processing algorithm may be employed instead of the one-bit algorithmic logic. For one example two-bit processing algorithm, four states may be provided, which may be very high load, above-target load, below-target load and very light load.

For the very high load state, the previously described OTA Load Indicator processing can be performed twice, potentially resulting in two interference offset corrections based on g(i). For the load above target and load below target states, the OTA Load Indicator processing may be performed once, and may therefore be the same as the one-bit processing described previously.

For the very light load state, the processing may also be executed twice, and in some implementations may result in two interference offset corrections (upward) based on g(i).

In either of these cases (i.e., whether for the one-bit case, two-bit case or other bit configurations), the results may be used by calculation module 412 to generate the transmit power metric, per resource block in subframe 'i', per neighboring cell 'k,' which may result in a minimum value metric as described previously.

The transmit power metric may then be sent to a serving cell 410 base station (e.g., eNB) 404. The base station/serving may then calculate an uplink (UL) transmit policy and allocations for UE 402. This policy may be based on the transmit power metric, and the policy and allocation may be forwarded to UE 402. Upon receipt, UE 402 may implement the transmit policy, and then continue to monitor LI transmissions from neighboring cells and then generate transmit power metrics for subsequent subframes (e.g., subframe 'i+1').

Figure 6:
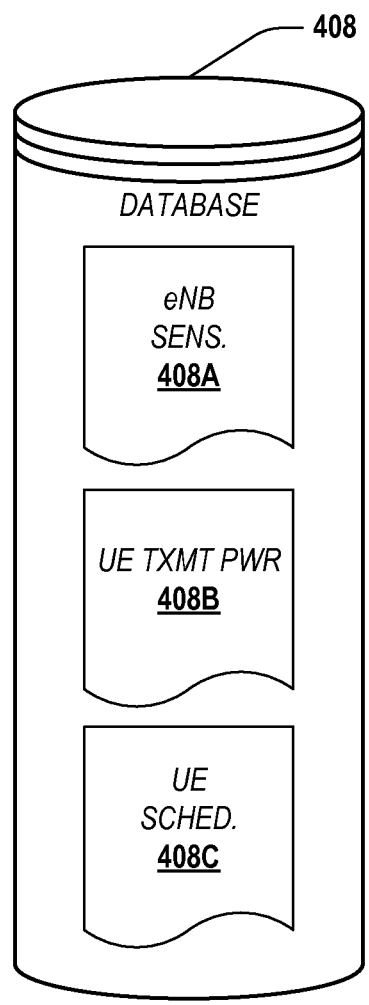
FIG. 6 illustrates details of an embodiment of a database on which various data and information may be stored.

In some implementations, serving cell base station 404 may be coupled with a database 408 configured to store data pertaining to the inter-cell interference coordination, with an example database 408 configuration illustrated in FIG. 6. For example, receiver sensitivity data may be stored in a first set of database entries or files 408A correlating wireless network nodes from the neighboring cells 420, 430 with respective receiver sensitivity data. Further, transmit power data submitted by UEs served by serving cell 410, such as UE 402, may be stored in a UE transmit power entry or file 408B. Additionally, UL schedules or other related data generated by the base station 404 may be stored in a UE scheduling entry or file 408C. Moreover, it should be appreciated that the respective files 408A, 408B, 408C may be updated over time, or appended to over time, to include time-varying sensitivity, transmit power, scheduling information, and/or other information (not shown in FIG. 6). Such data may then be employed in an adaptive inter-cell interference coordination, which may employ time-varying data as an optimization input.

Figure 8:
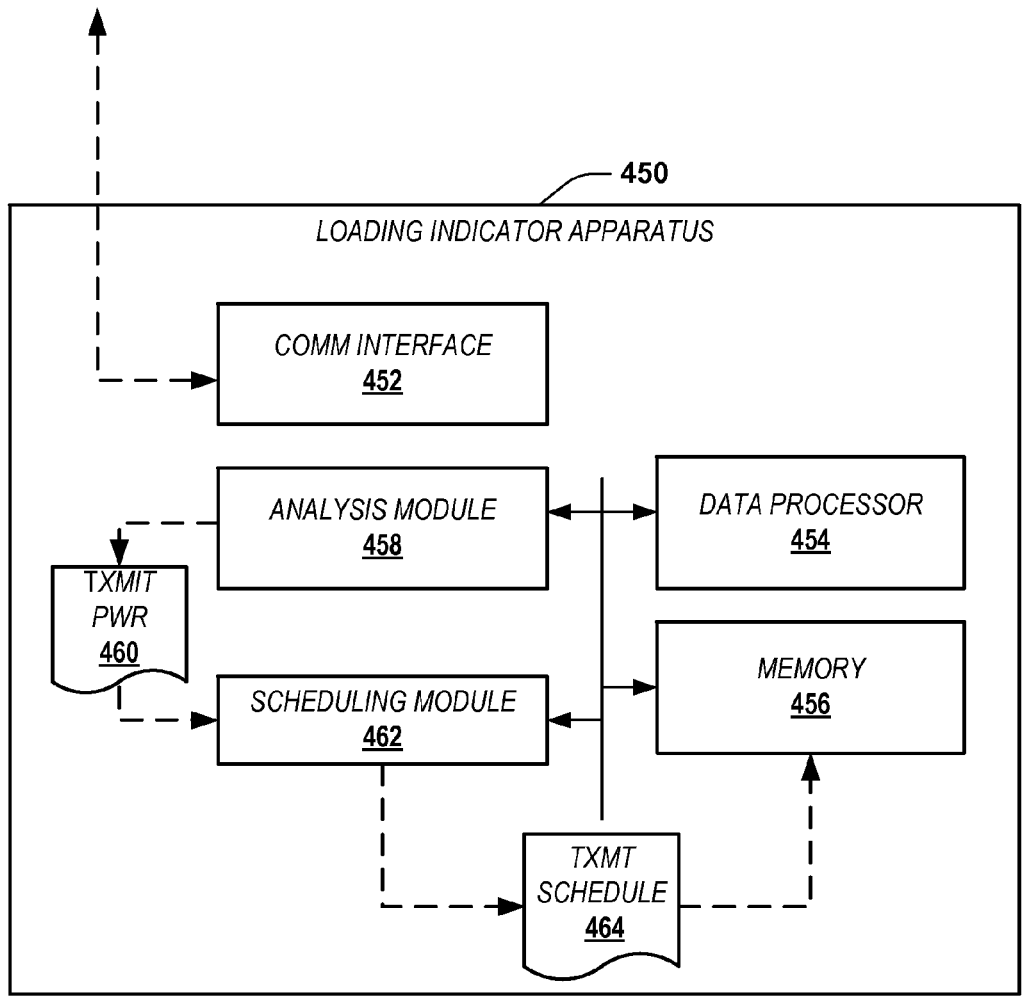
FIG. 8 illustrates details of an embodiment of a loading indicator apparatus.

FIG. 8 shows a block diagram of details of an embodiment of a loading indicator apparatus 450, according to aspects of the disclosure. Loading indicator apparatus 450 may be coupled to or incorporated into a base station, such as eNB 404 of FIG. 4.

In some implementations, loading indicator apparatus may be implemented as a component or element internal to the wireless network. For instance, apparatus 450 may be part of a terrestrial radio access network (e.g., coupled with an eNode B, coupled with a base station controller, or the like), or can be part of a wireless operator's core network coupled with the terrestrial radio access network (e.g., at a network gateway or other connection point, such as, for example, those illustrated in FIG. 3).

Figure 16:
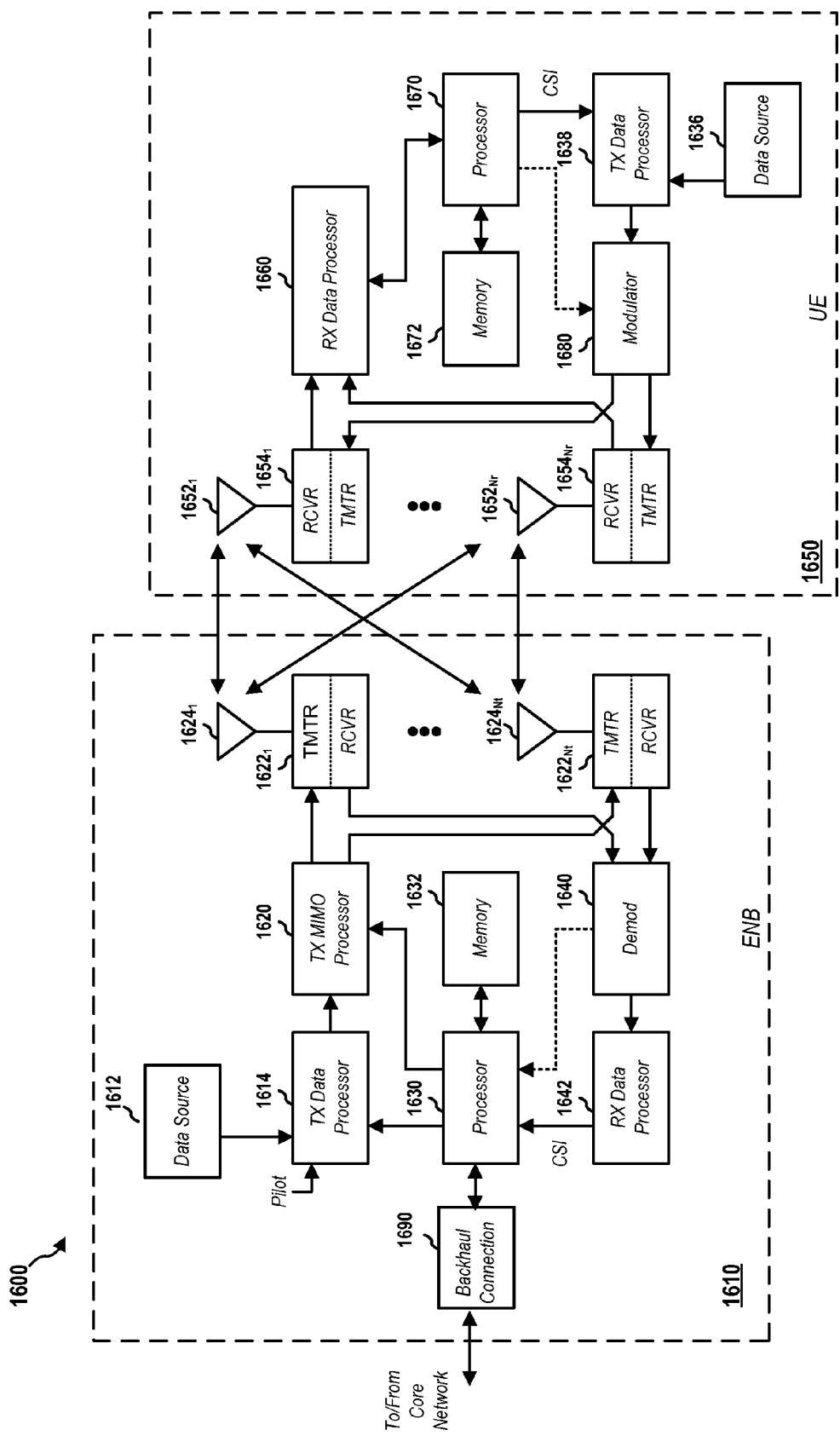
FIG. 16 illustrates details of an embodiment of user equipment (UE) and base station (eNB) architecture for a wireless communication system.

In either case, loading indicator apparatus 450 may be configured to employ a communication interface 452 for wired or wireless signaling at least with the base station. In some aspects, the communication interface 452 may be further be coupled with a backhaul network connecting the base station with a set of neighboring base stations, such as, for example, is illustrated in FIGS. 2 and 3. In other aspects, the communication interface 452 may be further coupled with a base station controller managing the set of neighboring base stations (not shown). In one embodiment, the communication interface 452 may include a wireless interface that can be employed to wirelessly communicate with neighboring base stations, such as, for example, via an X2 connection, or to one or more user equipment (UEs) served by the base station. In one embodiment, communication interface 452 includes a transmit-receive chain of a wireless base station or eNB (such as, for example, is shown in FIG. 16 and described subsequently herein), or is coupled with such a transmit-receive chain.

In one aspect, communication interface 452 can be employed by loading indicator apparatus 450 to obtain receiver sensitivity information from the subset of nearby base stations. For example, this sensitivity information may be measured at each respective base station receiver and submitted to apparatus 450 (e.g., via communication interface 452), shared among the base stations (e.g., via a backhaul network or other interconnection configuration).

In another aspect, the sensitivity information may be nominal sensitivity information generated for the respective base stations by loading indicator apparatus 450.

The receiver sensitivity information may be stored in memory 456. The information may be stored per base station. Alternately or in addition, an average or other suitable aggregate of the sensitivity information may be stored in memory 456. The sensitivity data may be employed by an analysis module 458, executed by and/or incorporated with data processor 454. Specifically, analysis module 458 may be configured to attempt to identify base stations within a wireless range of one or more UEs served by loading indicator apparatus 450, and distribute receiver sensitivity information for in-range base stations to the respective UEs.

In another aspect, analysis module 456 may be configured to send aggregate sensitivity data (e.g., average sensitivity data, nominal sensitivity data where base station-specific data is not available, or other stored sensitivity data) to UEs served by loading indicator apparatus 450. In either case, the sensitivity data may be distributed with other system information, including transmit strength of the respective base stations (for path loss calculations), or other parameters such as those described elsewhere herein.

Analysis module 458 may employ a particular physical downlink channel (PDCH) dedicated for loading information to convey the receiver sensitivity data. Optionally, a physical uplink channel (PUCH) can be established for response information transmitted by UEs served by loading indicator apparatus 450. Communication interface 452 may be configured to monitor the PUCH for a response to the system information distributed by analysis module 458. In another aspect, where no dedicated PUCH is established, UEs may employ an uplink control channel or other uplink channel to transmit the responses to the base station coupled with loading indicator apparatus 450.

A response provided by a UE may include a transmit power metric 460, which may be determined per resource block for each neighboring base station analyzed by the UE as a minimum value of a maximum power per resource block across a plurality of cells ($P_{RBmax}$). Examples of this processing are described elsewhere herein.

The transmit power metric may be forwarded to a scheduling module 462 that may be configured to generate a UL transmit schedule 464 for the UE, which may be based at least in part on the transmit power metric. The transmit schedule 464 may be stored in memory 456, and transmitted to a UE, such as UE 402, as shown in FIG. 4. In general, the UE transmit schedule 464 is configured to facilitate reduction of inter-cell interference among the set of base stations. As one example, the UL transmit schedule 464 may specify a transmit power for the UE on selected UL resources. Optionally, the UL transmit schedule 464 may be configured to assign the UE to particular resources for mitigation of interference in the network. In either case, the UL transmit schedule 464 may be generated according to an inter-cell interference coordination methodology among multiple neighboring or adjacent base stations and associated cells so as to reduce network interference.

Although the aforementioned systems and modules illustrated in FIGS. 4-8 have been described with respect to interaction between several components, modules and/or communication interfaces, it should be appreciated that such systems and components/modules/interfaces can include those components/modules or sub-modules specified therein, some of the specified components/modules or sub-modules, and/or additional modules (not shown). For example, in one aspect a system may include UE 402, serving cell base station 404, database 408, and loading indicator apparatus 450, or a different combination of these or other modules. Sub-module may also be implemented as modules communicatively coupled to other modules rather than included within parent modules. Additionally, it should be noted that one or more modules could be combined into a single module providing aggregate functionality. For example, analysis module 458 may include scheduling module 462, or vice versa, to facilitate analyzing respective UE transmit power data and generating respective UE UL schedules based on that data by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 9:
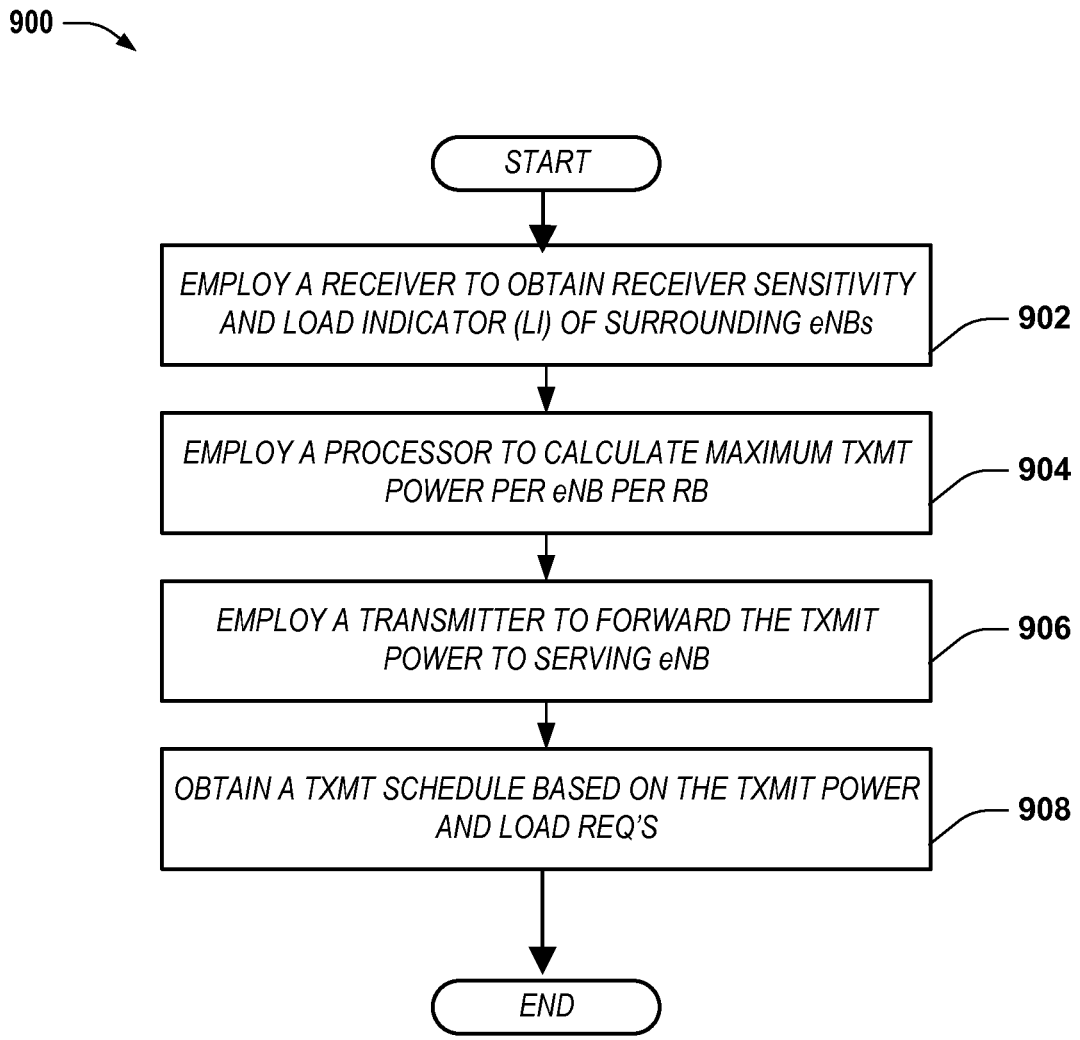
FIG. 9 illustrates details of a process for performing load indicator processing to facilitate inter-cell interference coordination.
Figure 10:
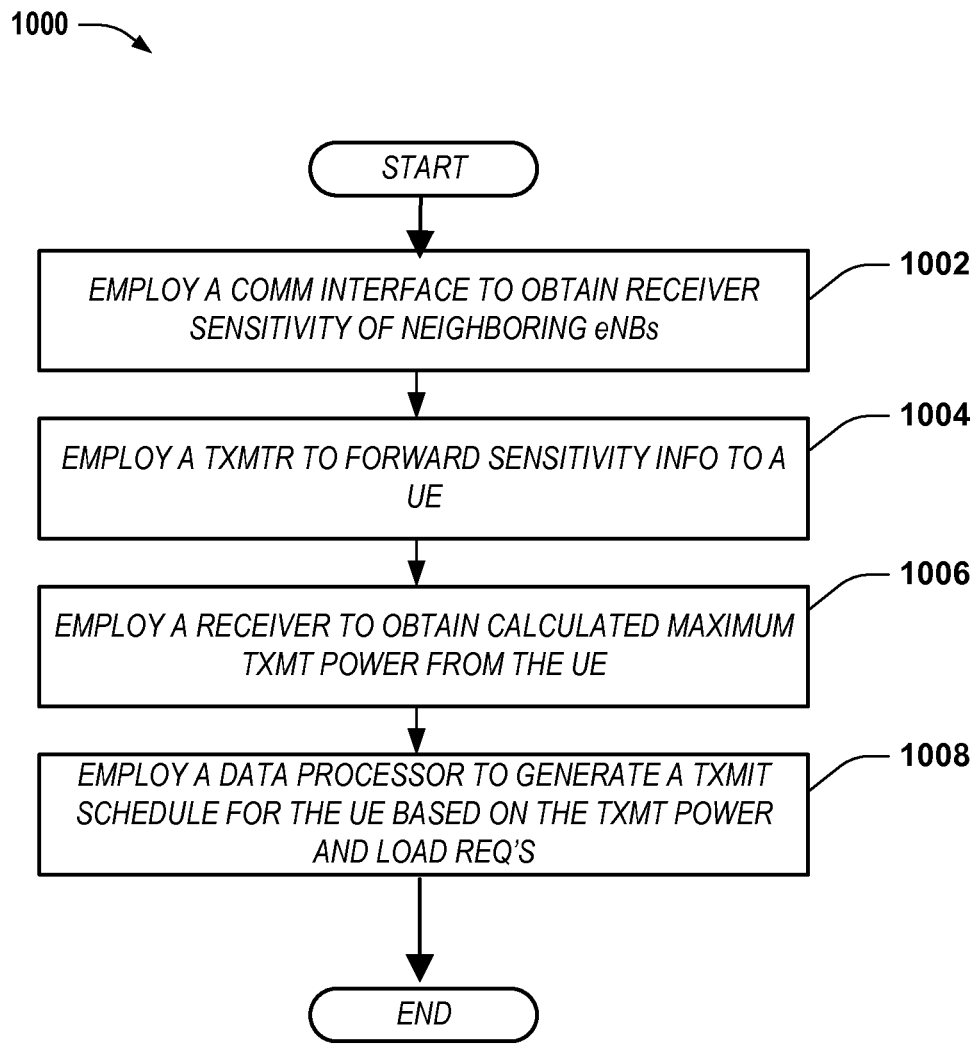
FIG. 10 illustrates details of an embodiment of a process for facilitating inter-cell interference coordination.

In view of the exemplary systems described previously herein, methodologies that may be implemented in accordance with the disclosed subject matter will be better appreciated with reference to FIG. 9 and FIG. 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 9 illustrates a flowchart of an example embodiment of a process 900 related to OTA-based loading and interference coordination according to disclosed aspects. At stage 902, a wireless receiver may be employed to obtain receiver sensitivity information and/or load indicator information associated with a set of neighboring base stations, such as eNBs in adjacent or neighboring cells. The information may be obtained at a network node such as a UE. At stage 904, a data processor may be employed to calculate a transmit power metric, such as a maximum transmit power per resource block of the respective eNBs, such as described elsewhere herein. At stage 906, a wireless transmitter may be employed to forward the calculated transmit power, for example from a UE to a serving eNB. Further, at stage 508, a transmit schedule may be obtained, where the schedule may include uplink channel allocation(s) or assignments, which may be based at least in part on the transmit power metric and interference loading requirements of an inter-cell interference coordination mechanism, such as described previously herein.

FIG. 10 illustrates a flowchart of an example embodiment of a process 1000 for providing resource scheduling based on OTA power determinations and loading coordination according to one or more aspects. At stage 1002, a communication interface may be employed to obtain receiver sensitivity information pertaining to one or more neighboring eNBs. At stage 1004, a transmitter may be employed to forward the receiver sensitivity information with system data to at least one served network node, such as a UE. The system data may further include transmit power information associated with the neighboring eNB. In an alternate aspect, the transmit power of the neighboring eNB can be set equal to a transmit power of a serving eNB. At stage 1006, a wireless receiver may be employed to obtain a calculated transmit power metric from the UE, which may be based in part on the system data. Furthermore, at stage 1008, a data processor may be employed to generate a transmit schedule for the UE, which may be based on the transmit power and/or interference loading requirements and/or other parameters.

Figure 11:
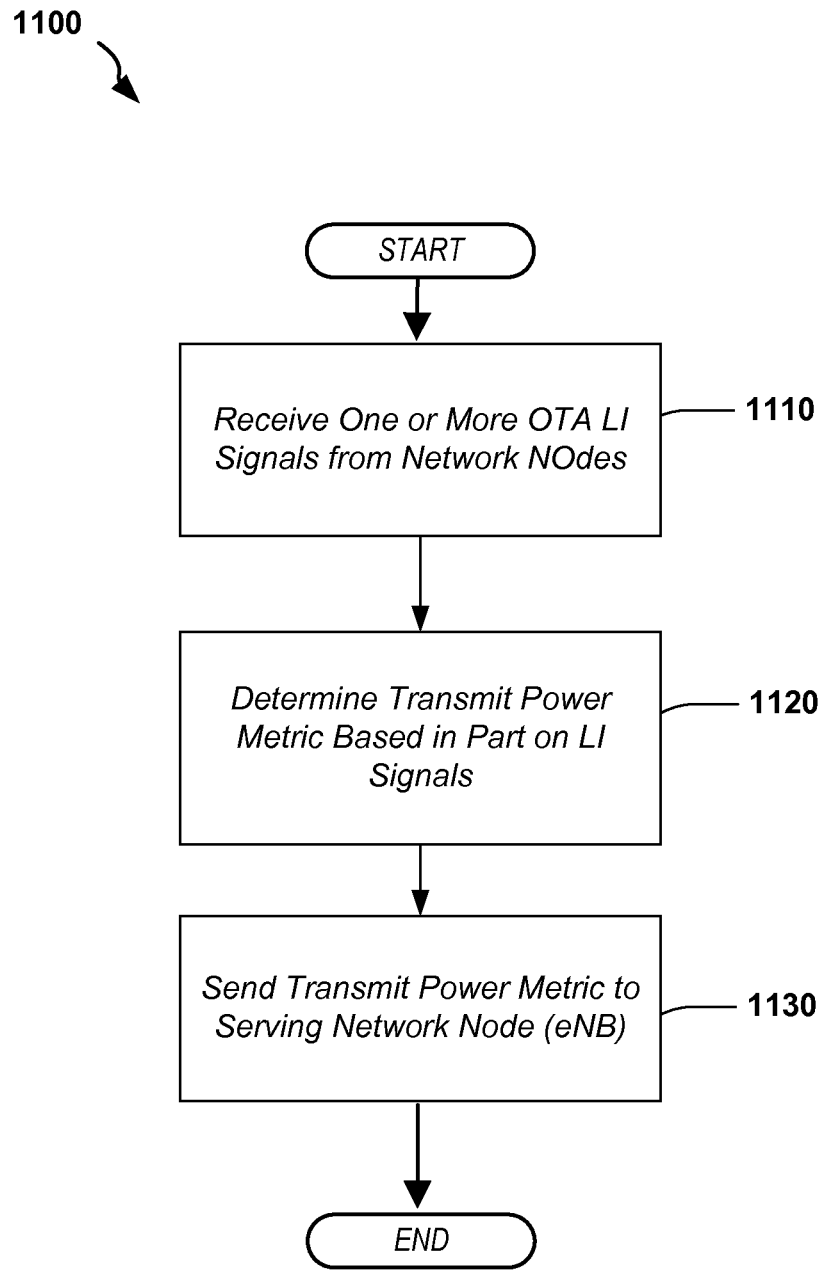
FIG. 11 illustrates details of an embodiment of a process for facilitating inter-cell interference coordination.

FIG. 11 illustrates a flowchart of an example embodiment of a process 1100 for providing transmit power metrics for inter-cell interference coordination according to various aspects. Process 1100 may begin at stage 1110 where one or more over the air (OTA) load indicator signals (LI) are received, which may be at a UE. The LI signals may be provided by one or a plurality of adjacent cells, such as from eNBs or other base stations in the adjacent cells. At stage 1120, a transmit power metric may be determined, such as described previously herein. The metric may be based on the LI signals, and/or may further be based on other parameters such as receiver sensitivity, path loss, or other data or information. The metric may be based on a minimum of a maximum transmit power level determined for each of the adjacent cells, or may be based on other functions of the adjacent cells, or may be a composite of information received from adjacent cells.

At stage 1130, the transmit power metric may be send to a serving network base station, such as an eNB associated with the cell. Upon receipt at the base station, the transmit power metric may be used to determine scheduling, such as for scheduling uplink transmission from the UE or other network nodes.

Figure 12:
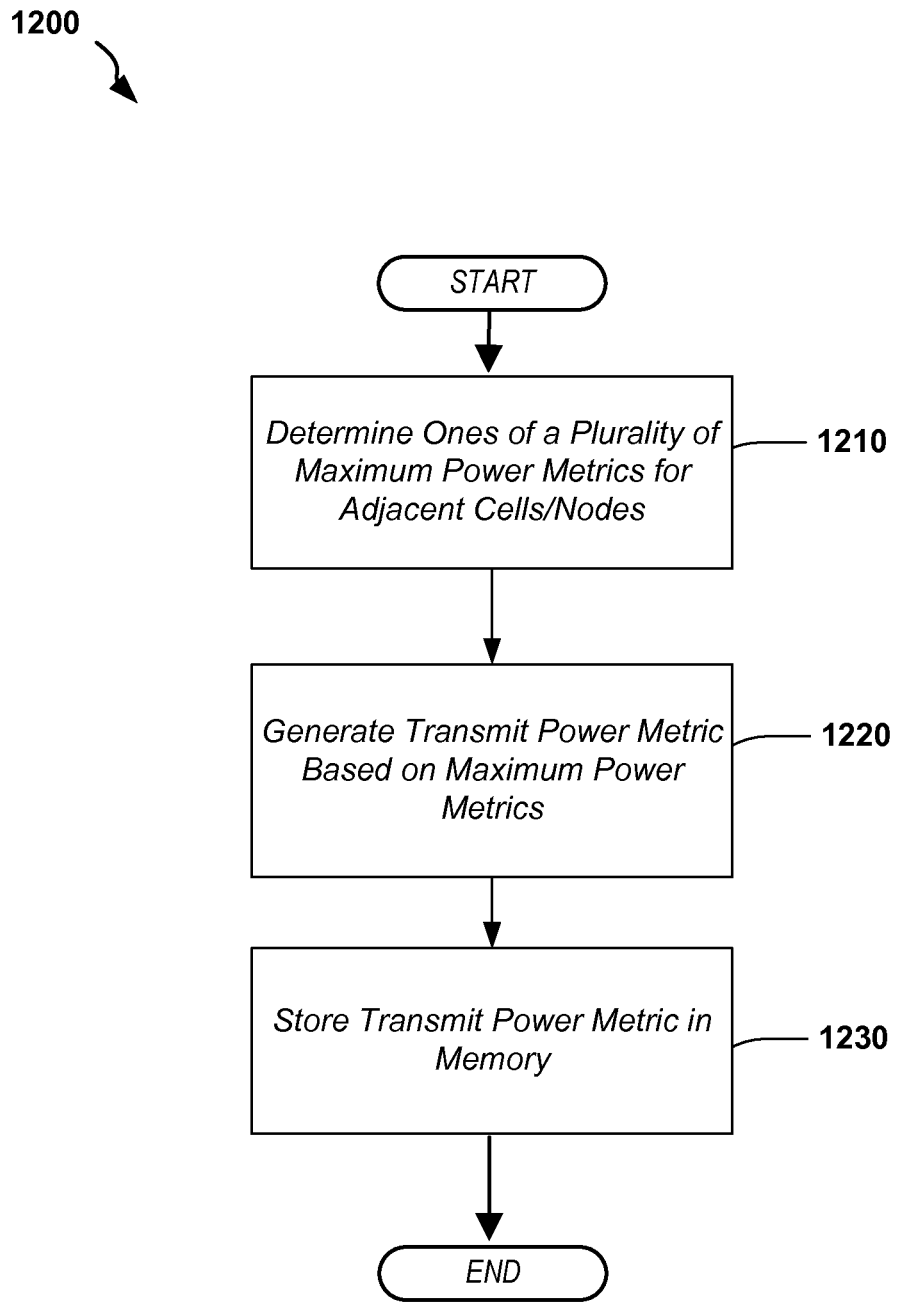
FIG. 12 illustrates details of an embodiment of a process for facilitating inter-cell interference coordination.

FIG. 12 illustrates a flowchart of an example embodiment of a process 1200 for generating a transmit power metric in accordance with various aspects. At stage 1210, ones of a plurality of maximum power metrics may be determined. This may be done at a UE based on OTA LI signaling received from a plurality of adjacent or neighboring cells. At stage 1220, a transmit power metric may be generated, such as described previously herein. The transmit power metric may be a function of the LI signals received from the adjacent or neighboring stations. The transmit power metric may be further based on a receiver sensitivity value and/or on a path loss value, and/or on other related or associated parameters, such as a UE offset metric. The generating may further include correction for accumulated OTA correction. At stage 1230, the transmit power metric may be stored in a memory, which may be a memory element of a UE, such as shown in FIG. 16. In addition, the transmit power metric may be sent to a serving base station, such as an associated eNB, for further use in providing functions such as UE uplink scheduling and allocation.

Figure 13:
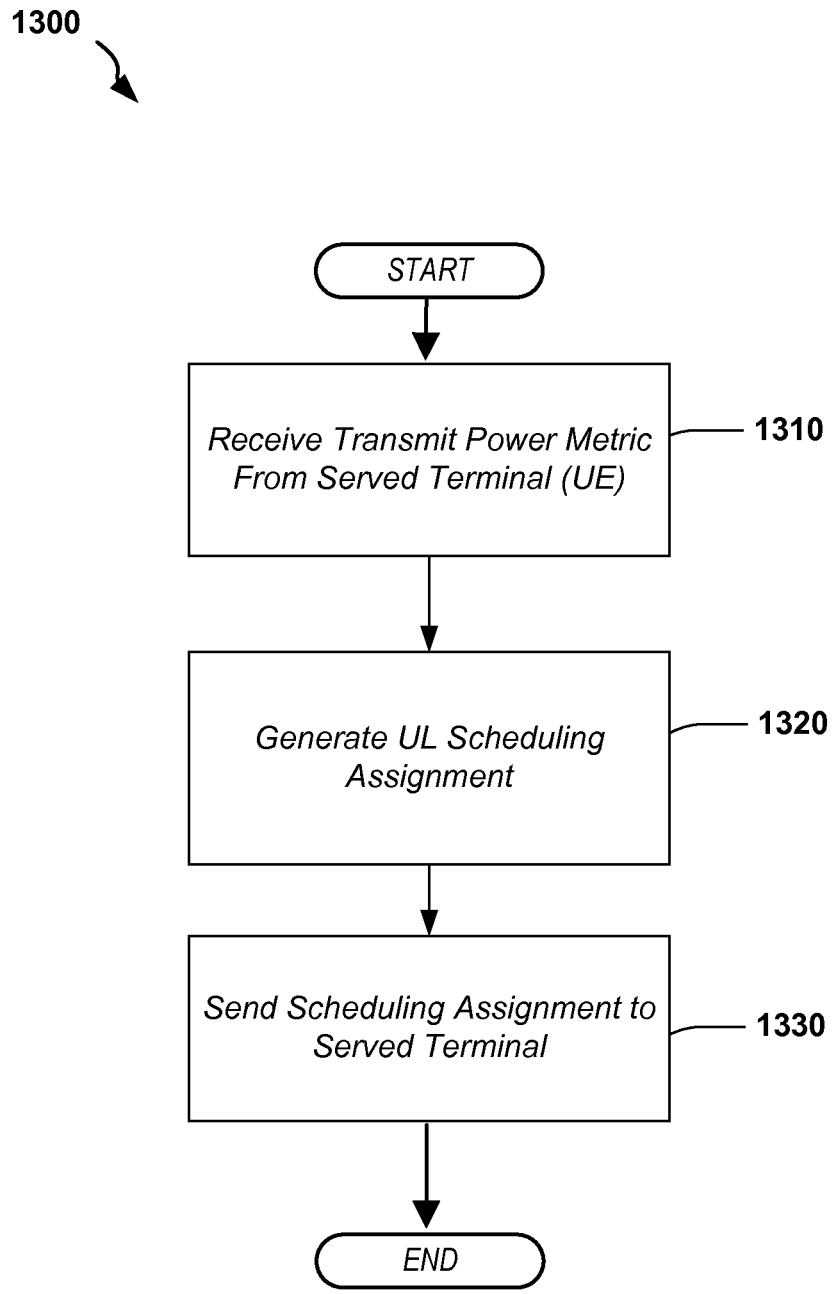
FIG. 13 illustrates details of an embodiment of a process for facilitating inter-cell interference coordination.

FIG. 13 illustrates a flowchart of an example embodiment of a process 1300 for generating uplink (UL) scheduling in accordance with various aspects. At stage 1310, a transmit power metric may be received, such as at a cell base station such as an eNB. The transmit power metric may be received from a served terminal, such as a UE. At stage 1320, a schedule may be generated. The schedule may be based in part on the transmit power metric. The schedule may be based on other data or information provided to the base station. At stage 1330, the scheduling information, which may include uplink channel assignments, power levels, or other uplink-related signaling data or information may be provided to the served UE. The UE may then provide uplink transmission in accordance with the schedule so as to facilitate inter-cell interference mitigation.

Figure 14:
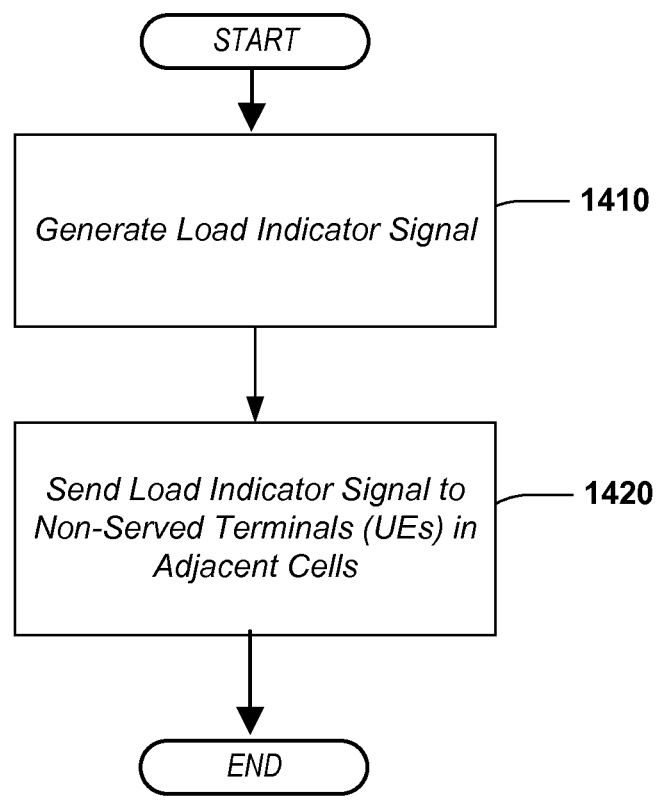
FIG. 14 illustrates details of an embodiment of a process for facilitating inter-cell interference coordination.

FIG. 14 illustrates a flowchart of an example embodiment of a process 1400 for providing load indication signaling in accordance with various aspects. At stage 1410, a load indication signal (LI) may be generated. This may be done at a network node, such as base station or eNB, and may be further configured to provide OTA loading (or overloading) information to nodes in adjacent cells, such as UEs associated with adjacent or neighboring cells. At stage 1420, the LI signal may be transmitted. The transmission may be based on particular downlink channel configurations that may be shared or may be dedicated to OTA LI signaling. In addition, the base station may provide information to nodes in adjacent cells, such as adjacent eNBs. The information may relate to receiver sensitivity, path loss, or other data or information.

Figure 15:
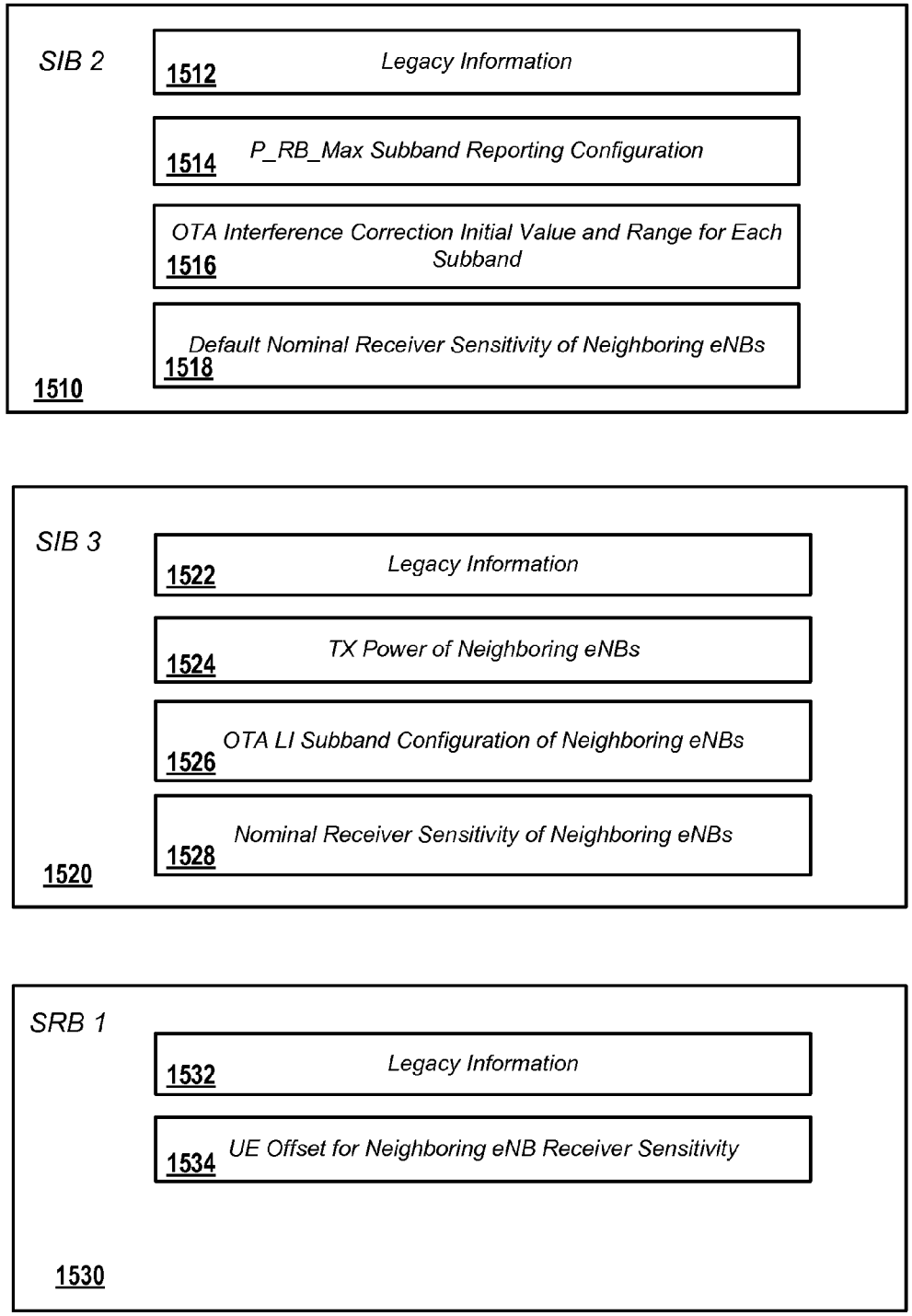
FIG. 15 illustrates example information elements (IE) for embodiments of system information broadcast (SIB) data.

FIG. 15 illustrates examples of system information that may be provided to facilitate inter-cell interference coordination. In particular, 1510 illustrates an example embodiment of a system information block (SIB), which may be denoted as SIB2, and may be transmitted from a cell base station such as an eNB. SIB2 may include information elements (IEs) 1512, 1514, 1516, and 1518. IE(s) 1512 includes legacy SIB2 information. IE 1514 includes information such as a subband reporting configuration, which may be a $P_{RBmax}$ subband reporting configuration in accordance with transmit power metric determination described previously herein. IE 1516 may include an OTA interference correction value, and may further include a range for each configured subband. IE 1518 may include receiver sensitivity information, such as a default nominal receiver sensitivity for neighboring eNBs, which may be determined or provided as described previously herein.

SIB 1520 illustrates an example configuration of a SIB denoted as SIB3 including IEs 1522, 1524, 1526, and 1528. As with SIB 1510, SIB 1520 includes legacy SIB information (in this case SIB2 information as IE(s) 1522), along with IE

1524, which may include data related to transmit power of neighboring cells/eNBs. IE 1526 includes information associated with OTA LI subband configuration of neighboring cells/eNBs. IE 1528 include information associated with receiver sensitivity of neighboring cells/eNBs.

Block 1530 illustrates an example configuration of a signaling radio bearer (SRB), denoted as SRB1. SRB 1 may include legacy information 1532, and may further include data or information 1534 related to UE offsets for neighboring eNB receiver sensitivity.

FIG. 16 illustrates a block diagram of an example embodiment of a base station 1610 (i.e., an eNB or HeNB) and a terminal 1650 (i.e., a terminal, AT or UE) in communication system 1600, which may be an LTE communications system. These systems may correspond to those shown elsewhere herein, such as in FIGS. 1-4, and may be configured to implement the processes illustrated previously herein in FIGS. 9-14.

Various functions may be performed in the processors and memories as shown in base station 1610 (and/or in other components not shown), such as receipt of transmit signal metrics and determination of UE scheduling, as well as other functions as described previously herein. UE 1650 may include one or more modules to receive signals from base station 1610 to determine channel characteristics or other information, such as receipt and processing of load indicator signals and other system data, and to generate corresponding transmit power metrics or other data or information, such as power level information, and/or other information associated with base station 1610 or other base stations, such as base stations in adjacent or neighboring cells (not shown in FIG. 16).

In one embodiment, base station 1610 may generate scheduling information based on transmit power metrics received from UE 1650 or from backhaul signaling from another base station or a core network (not shown in FIG. 16) as described previously herein. This may be done in one or more components (or other components not shown) of base station 1610, such as processors 1614, 1630 and memory 1632. Base station 1610 may also include a transmit module including one or more components (or other components not shown) of eNB 1610, such as transmit modules 1624. Base station 1610 may include an interference cancellation module including one or more components (or other components not shown), such as processors 1630, 1642, demodulator module 1640, and memory 1632 to provide interference cancellation functionality. Base station 1610 may include a subframe partition coordination module including one or more components (or other components not shown), such as processors 1630, 1614 and memory 1632 to perform subframe partition functions as described previously herein and/or manage the transmitter module based on the subframe partition information. Base station 1610 may also include a control module for controlling receiver functionality. Base station 1610 may include a network connection module 1690 to provide networking with other systems, such as backhaul systems in the core network or other components as shown in FIGS. 2 and 3.

Likewise, UE 1650 may include a receive module including one or more components of UE 1650 (or other components not shown), such as receivers 1654. UE 1650 may also include a signal information module including one or more components (or other components not shown) of UE 1650, such as processors 1660 and 1670, and memory 1672. In one embodiment, one or more signals received at UE 1650 are processed to estimate channel characteristics, power information, spatial information and/or other information regarding eNBs, such as base station 1610 and/or other base stations (not shown). Measurements may be performed during static subframes that are noticed to UE 1650 by base station 1610. Memories 1632 and 1672 may be used to store computer code for execution on one or more processors, such as processors 1660, 1670 and 1638, to implement processes associated with channel measurement and information, power level and/or spatial information determination, cell ID selection, inter-cell coordination, interference cancellation control, as well as other functions related to subframe allocation, interlacing, and associated transmission and reception as are described herein.

In operation, at the base station 1610, traffic data for a number of data streams may be provided from a data source 1612 to a transmit (TX) data processor 1614, where it may be processed and transmitted to one or more UEs 1650. The transmitted data may be controlled as described previously herein so as to provide interlaced subframe transmissions and/or perform associated signal measurements at one or more UEs 1650.

In one aspect, each data stream is processed and transmitted over a respective transmitter sub-system (shown as transmitters 1624$_1$-1624$_{Nt}$) of base station 1610. TX data processor 1614 receives, formats, codes, and interleaves the traffic data for each data stream based on a particular coding scheme selected for that data stream so as to provide coded data. In particular, base station 1610 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 1614 as shown in FIG. 16 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 1630 based on instructions stored in memory 1632, or in other memory or instruction storage media of UE 1650 (not shown).

The modulation symbols for all data streams may then be provided to a TX MIMO processor 1620, which may further process the modulation symbols (e.g., for OFDM implementations). TX MIMO processor 1620 may then provide Nt modulation symbol streams to N$_t$ transmitters (TMTR) 1622$_1$ through 1622$_{Nt}$. The various symbols may be mapped to associated RBs for transmission.

TX MIMO processor 1630 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 . . . b$_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1x1+B2x2+BN$_S$xN$_S$, where N$_S$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $1622_1$ through $1622_{Nt}$ receives and processes a respective symbol stream to provide one or more analog signals, and further conditions (e.g., amplifies, filters, and upconverts) the analog signals to provide a modulated signal suitable for transmission over the MIMO channel. N$_t$ modulated signals from transmitters $1622_1$ through $1622_{Nt}$ are then transmitted from N$_t$ antennas $1624_1$ through $1624_{Nt}$, respectively.

At UE 1650, the transmitted modulated signals are received by N$_r$ antennas $1652_1$ through $1652_{Nr}$ and the received signal from each antenna 1652 is provided to a respective receiver (RCVR) $1654_1$ through $1652_{Nr}$. Each receiver 1654 conditions (e.g., filters, amplifies, and downconverts) a respective received signal, digitizes the conditioned signal to provide samples, and further processes the samples to provide a corresponding "received" symbol stream.

An RX data processor 1660 then receives and processes the N$_r$ received symbol streams from N$_r$ receivers $1654_1$ through $1652_{Nr}$ based on a particular receiver processing technique so as to provide N$_S$ "detected" symbol streams so at to provide estimates of the N$_S$ transmitted symbol streams. The RX data processor 1660 then demodulates, deinterleaves, and decodes each detected symbol stream to recover the traffic data for the data stream. The processing by RX data processor 1660 is typically complementary to that performed by TX MIMO processor 1620 and TX data processor 1614 in base station 1610.

A processor 1670 may periodically determine a precoding matrix for use as is described further below. Processor 1670 may then formulate a reverse link message that may include a matrix index portion and a rank value portion. In various aspects, the reverse link message may include various types of information regarding the communication link and/or the received data stream. The reverse link message may then be processed by a TX data processor 1638, which may also receive traffic data for a number of data streams from a data source 1636 which may then be modulated by a modulator 1680, conditioned by transmitters $1654_1$ through $1654_{Nr}$, and transmitted back to base station 1610. Information transmitted back to base station 1610 may include power level and/or spatial information for providing beamforming to mitigate interference from base station 1610.

At base station 1610, the modulated signals from UE 1650 are received by antennas 1624, conditioned by receivers 1622, demodulated by a demodulator 1640, and processed by a RX data processor 1642 to extract the message transmitted by UE 1650. Processor 1630 then determines which precoding matrix to use for determining beamforming weights, and then processes the extracted message.

Figure 17:
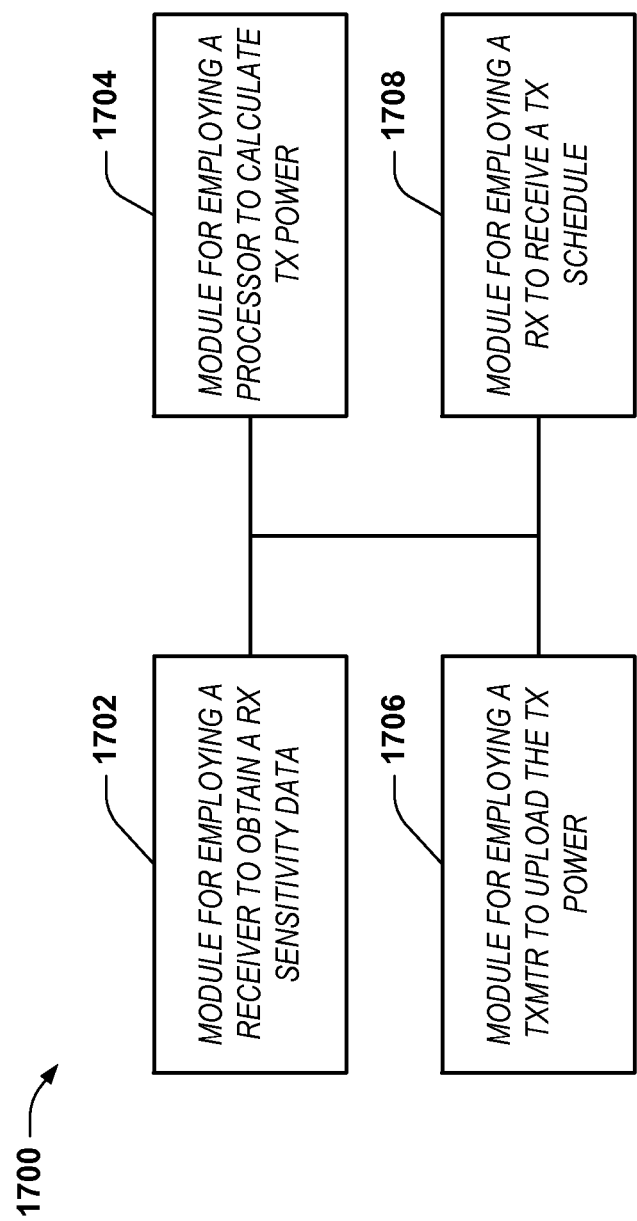
FIG. 17 illustrates embodiments of modules for facilitating inter-cell interference coordination in a wireless communication system.
Figure 18:
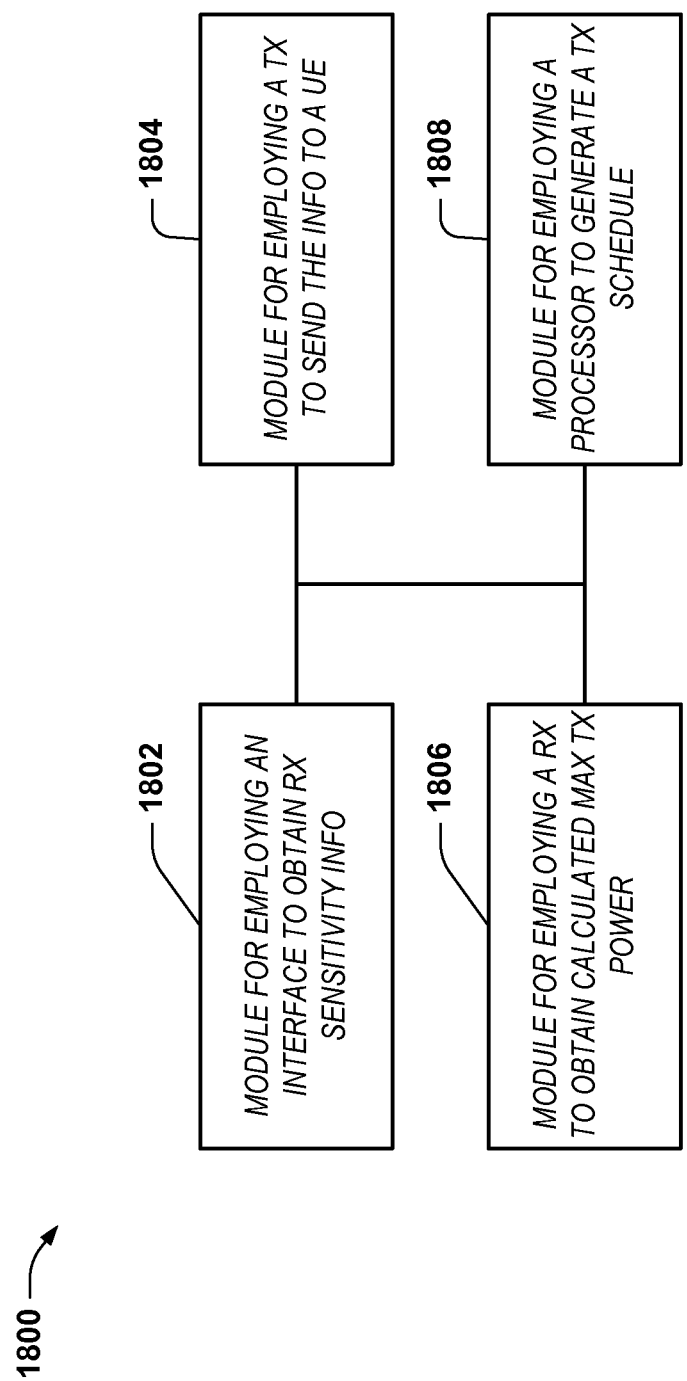
FIG. 18 illustrates embodiments of modules for facilitating inter-cell interference coordination in a wireless communication system.

FIG. 17 and FIG. 18 illustrate embodiments of block diagrams of example systems 1700 and 1800, which can be configured to provide and facilitate, respectively, OTA loading indicators for inter-cell interference coordination. For example, systems 1700 and 1800 can reside at least partially within a wireless communication network and/or within a transmitter such as a node, base station, eNB, access point, user terminal, UE, personal computer coupled with a mobile interface card, or the like. As a further example, the components of systems 1700 and 1800 may be incorporated in a UE and eNB such as shown in FIGS. 1, 2, 4 or FIG. 16. It should be appreciated that systems 1700 and 1800 are represented as including functional blocks, which can be functional blocks that represent functions implemented by a processor, software, firmware, programmable logic, or combinations thereof.

As shown in FIG. 17, system 1700 may include a first module 1702 configured to employ a receiver to obtain receiver sensitivity data pertaining to a set of nearby base stations, which may be eNBs in neighboring or adjacent cells. The receiver sensitivity data can be particular to respective base stations, can be an aggregate of data pertaining to a subset of the base stations, can be nominal data generated for one or more base stations (e.g., based on a path loss calculation), or can be other sensitivity related data. In addition, system 1700 may include a second module 1704 configured for employing a processor to calculate a transmission power for respective base stations for a particular resource block (e.g., time slot of a wireless signal). The transmission power can be a maximum transmission power based at least in part on the receiver sensitivity data. Additionally, the transmit power can be based on a loading indicator broadcast by the neighboring base stations. In one aspect, the transmission power can further be based on a path loss metric to respective base stations. In another aspect, the transmission power can be based on a combination of the foregoing factors, or like or additional factors.

In addition, system 1700 may include a third module 1706 configured for employing a wireless transmitter to upload the transmit power to a serving cell, such as to a service cell base station or eNB. In one example, respective transmit power calculations for each base station can be transmitted as a transmit power metric; in other example aspects, only the lowest maximum transmit power calculation for all of the base stations may be transmitted as the transmit power metric. Additionally, system 1700 may include a fourth module 1708 configured for employing a wireless receiver to receive an UL transmission schedule from the serving cell, which may be based on the maximum transmit power calculation(s).

FIG. 18 illustrates an embodiment of a system 1800 for facilitating inter-cell interference coordination processing. System 1800 may include a first module 1802 configured for employing a communication interface to obtain receiver sensitivity data from a set of neighboring base stations. For example, module 1802 can employ a wired or wireless backhaul among the base stations to obtain the data. In addition, system 1800 may include a second module 1804 configured for employing a wireless transmitter to send the sensitivity information to one or more UEs served by system 1800. System 1800 may include a third module 1806 configured to employ a wireless receiver to obtain a calculated transmit power metric from the UE, which may be a served UE in a served cell, with the metric based on the sensitivity information, and optionally based on other wireless information (e.g., interference correction parameter, path loss, or the like). Further, system 1800 may include a fourth module 1808 configured for employing a data processor to generate a UL transmission schedule for the UE, which may be based on the transmit power metric.

It is noted that in certain implementations apparatus and modules as described herein may be employed with a UE or other fixed or mobile device, and can be, for instance, implemented as a module such as an SD card, a network card, a wireless network card, a computer (including laptops, desktops, personal digital assistants PDAs), mobile phones, smart phones, or any other suitable device that can be utilized to access a network. The UE may access the network by way of an access component.

In one example, a connection between the UE and the access components may be wireless in nature, in which access components may be a serving eNB (or other base station) and the mobile device may be a wireless terminal. For instance, the terminal and base station may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, and the like. The access component can include one or more interfaces, e.g., communication modules, for communicating with other network nodes. Additionally, the access component can be a base station such as an eNB (or other wireless access point) in a cellular network, wherein base stations (or wireless access points) are utilized to provide wireless coverage areas to a plurality of subscribers.

In some configurations, the apparatus for wireless communication includes means for performing various functions as described herein. In one aspect, the aforementioned means may be a processor or processors and associated memory in which embodiments reside, such as are shown in FIGS. 16-18, and which are configured to perform the functions recited by the aforementioned means. The may be, for example, modules or apparatus residing in UEs, eNBs or other network nodes such as are shown herein and configured to perform the inter-cell interference related functions described herein. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

The invention claimed is:

1. A method for providing inter-cell interference coordination, comprising:
   receiving a plurality of load indicator signals from a plurality of network nodes operating in one or more adjacent cells;
   determining a transmit power metric based at least, in part, on the plurality of load indicator signals and, in part, on a plurality of path loss values associated with the plurality of network nodes; and
   sending the transmit power metric to a serving network node;
   wherein determining the transmit power metric includes determining a plurality of power metrics, the determining of the plurality of power metrics including determining one or more maximum power metrics for each of the plurality of load indicator signals, and
   wherein the transmit power metric is based on a minimum of the plurality of maximum power metrics.

2. The method of claim 1, wherein the determining of the transmit power metric includes generating a maximum power per resource block metric.

3. The method of claim 2, wherein the maximum power per resource block metric is based on a subband metric generated for each of one or more configured subbands.

4. The method of claim 1, further comprising receiving a receiver sensitivity data, wherein the transmit power metric is further based in part on the receiver sensitivity data.

5. The method of claim 1, wherein the sending includes sending the transmit power metric in a protocol data unit (PDU) format corresponding to a configured number of subbands.

6. The method of claim 1, wherein the serving network node and the plurality of network nodes operating in adjacent cells are eNBs.

7. The method of claim 1, wherein the determining is performed during a single subframe.

8. The method of claim 1, wherein the sending is performed once per subframe or once per an integer multiple of subframes.

9. The method of claim 1, further comprising receiving a specific uplink channel assignment, wherein the transmit power metric is sent on the received uplink channel assignment.

10. A computer program product comprising a non-transitory computer-readable medium including codes for causing a computer to:
    receive a plurality of load indicator signals from a plurality of network nodes operating in one or more adjacent cells;
    determine a transmit power metric based at least, in part, on the plurality of load indicator signals and, in part, on a plurality of path loss values associated with the plurality of network nodes; and
    send the transmit power metric to a serving network node;
    wherein determining the transmit power metric includes determining a plurality of power metrics, the determining of the plurality of power metrics including determining one or more maximum power metrics for each of the plurality of load indicator signals, and
    wherein the transmit power metric is based on a minimum of the plurality of maximum power metrics.

11. The computer program product of claim 10, wherein the codes for determining the transmit power metric include codes for causing the computer to generate a maximum power per resource block metric.

12. The computer program product of claim 10, wherein the codes further include codes for causing the computer to receive sensitivity data, wherein the transmit power metric is further based in part on the receiver sensitivity data.

13. A communications device, comprising:
    a receiver module configured to receive a plurality of indicator signals from a plurality of network nodes operating in one or more adjacent cells;
    a processor module configured
      to determine a transmit power metric based at least, in part, on the plurality of load indicator signals and, in part, on a plurality of path loss values associated with the plurality of network nodes; and
    a transmitter module configured to send the transmit power metric to a serving network node;
    wherein determining the transmit power metric includes determining a plurality of power metrics, the determining of the plurality of power metrics including determining one or more maximum power metrics for each of the plurality of load indicator signals, and
    wherein the transmit power metric is based on a minimum of the plurality of maximum power metrics.

14. The communications device of claim 13, wherein the processor module is configured to determine the transmit power metric by generating a maximum power per resource block metric.

15. The communications device of claim 13, wherein the processor module is further configured to generate the transmit power metric based in part on receiver sensitivity data.

16. A communications device, comprising:
    means for receiving a plurality of load indicator signals from a plurality of network nodes operating in one or more adjacent cells;
    means for determining a transmit power metric based at least, in part, on the plurality of load indicator signals and, in part, on a plurality of path loss values associated with the plurality of network nodes; and
    means for sending the transmit power metric to a serving network node;
    wherein the means for determining determines a plurality of power metrics, the determining of the plurality of power metrics including determining one or more maximum power metrics for each of the plurality of load indicator signals, and
    wherein the transmit power metric is based on a minimum of the plurality of maximum power metrics.

* * * * *